United States Patent
Nishikawa et al.

(10) Patent No.: US 7,169,325 B2
(45) Date of Patent: Jan. 30, 2007

(54) LIQUID CRYSTALLINE COMPOUND, LIQUID CRYSTALLINE COMPOSITION AND RETARDATION FILM

(75) Inventors: Hideyuki Nishikawa, Kanagawa (JP); Atsuhiro Ohkawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/892,270

(22) Filed: Jul. 16, 2004

(65) Prior Publication Data

US 2005/0012071 A1    Jan. 20, 2005

(30) Foreign Application Priority Data

Jul. 17, 2003  (JP)  ............................. 2003-276043

(51) Int. Cl.
    C09K 19/52    (2006.01)
    C09K 19/34    (2006.01)
    C07C 19/20    (2006.01)
    C07D 239/02   (2006.01)
    C07D 237/00   (2006.01)

(52) U.S. Cl. ........................... 252/299.01; 252/299.61; 252/299.67; 252/299.5; 544/224; 544/242; 544/298; 544/335; 546/339; 560/8; 560/56; 560/75; 560/85

(58) Field of Classification Search ........... 252/299.63, 252/299.01, 299.1, 299.61, 582, 299.2, 299.67, 252/299.5; 544/298, 224, 242, 335; 546/339; 428/1.1; 560/8, 55, 78, 85
See application file for complete search history.

(56) References Cited

U.S. PATENT DOCUMENTS

| | | | | |
|---|---|---|---|---|
| 6,139,771 A | * | 10/2000 | Walba et al. | .......... 252/299.01 |
| 6,569,504 B1 | | 5/2003 | Walba et al. | |
| 2004/0142116 A1 | * | 7/2004 | Nishikawa et al. | .......... 428/1.1 |

FOREIGN PATENT DOCUMENTS

JP    2001-233837    8/2001

OTHER PUBLICATIONS

Wautelet et al., "Rigid Conjugated Polymers for Nonlinear Optics. 2. Synthesis and Characterization of Phenylene-Ethynylene Oligomers", Marcomolecules, 1996, 29, 446-455.*

Moggio et al., "Orientation of Polydiacetylene and Poly(phenylene ethynylene) Films by Epitaxy and Rubbing", Marcomolecules, 2001, 34, 7091-7099.*

* cited by examiner

*Primary Examiner*—Shean C Wu
(74) *Attorney, Agent, or Firm*—Buchanan Ingersoll & Rooney PC

(57) ABSTRACT

To provide a liquid crystalline compound capable of exhibiting a biaxial liquid crystal phase, provide a trifunctional or greater functional polymerizable liquid crystalline compound having polymerizable groups, and also to provide a liquid crystalline composition and a retardation film which are using the liquid crystalline compound, a compound and a liquid crystalline compound each are represented by formula (I) defined in the specification; a liquid crystalline composition contains the compound; and a retardation film has an optically anisotropic layer formed from the compound.

15 Claims, No Drawings

LIQUID CRYSTALLINE COMPOUND, LIQUID CRYSTALLINE COMPOSITION AND RETARDATION FILM

BACKGROUND OF THE INVENTION

1. Field of the Invention

The present invention relates to a liquid crystalline compound, particularly a liquid crystalline compound having a tolan skeleton, which is very useful for the production of a retardation film or the like. The present invention also relates to a liquid crystalline composition containing the liquid crystalline compound and a retardation film having an optically anisotropic layer containing the liquid crystalline compound.

2. Background Art

Regarding a liquid crystalline compound having a skeleton such that two or more rod-shaped liquid crystalline compounds are linked in parallel, various reports have been made (see, for example, Background art 1: *Senryo to Yakuhin* (*Dyes and Chemicals*), Vol. 42, No. 4, page 85 (1997)). By linking two or more rod-shaped liquid crystalline compounds in parallel, the rod-like shape changes into an elliptical shape. This elliptical skeleton is considered important for exhibiting a biaxial liquid crystal phase. However, not only in such a skeleton but also in other various skeletons, the biaxial liquid crystal phase has been heretofore scarcely confirmed.

Also, studies are being made to apply a liquid crystalline compound to optical films such as retardation film by making use of its optical anisotropy. In this case, a polymerizable group is introduced into the liquid crystalline compound so as to suppress the flowability of liquid crystalline compound or increase the film strength. However, in the case of introducing a polymerizable group into a normal rod-like liquid crystalline compound, the polymerizable group is introduced into the side chain terminal of the rod-like liquid crystalline compound and therefore, a bifunctional polymerizable liquid crystalline compound mostly results. In order to overcome the problem of film strength at the application to a retardation film or the like, a trifunctional or greater functional polymerizable compound is necessary, but when a number of polymerizable groups is introduced into a rod-like liquid crystalline compound, the liquid crystallinity is lost and a desired optical anisotropy cannot be obtained. Accordingly, it is difficult in many cases to satisfy both the film strength and the liquid crystallinity. From such an aspect, development of a trifunctional or greater functional polymerizable liquid crystalline compound having a polymerizable group and at the same time, capable of exhibiting liquid crystallinity is demanded and several compounds have been heretofore developed (see, for example, Background art 2: JP-A-2001-233837 (the term "JP-A" as used herein means an "unexamined published Japanese patent application")).

SUMMARY OF THE INVENTION

Under these circumstances, an object of the present invention is to provide a liquid crystalline compound capable of exhibiting a biaxial liquid crystal phase. Another object of the present invention is to provide a trifunctional or greater functional polymerizable liquid crystalline compound having polymerizable groups. Still another object of the present invention is to provide a liquid crystalline composition and a retardation film, which are using the liquid crystalline compound.

These objects can be attained by a novel compound having a tolan-base skeleton, that is, the following techniques.

(1) A compound represented by the following formula (I):

Formula (I):

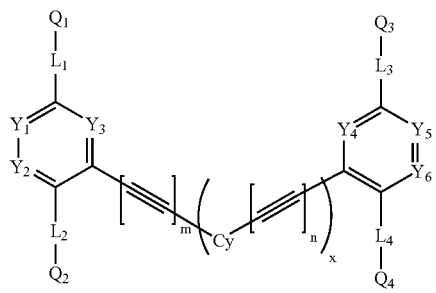

wherein Cy represents a divalent cyclic group, x represents an integer of 1 to 20, m and n each independently represent an integer of 1 to 4, $Y_1$ to $Y_6$ each independently represent methine or a nitrogen atom, $Q_1$ to $Q_4$ each independently represent a polymerizable group or a methyl group, and $L_1$ to $L_4$ each independently represent a divalent linking group.

(2) The compound according to item (1), which is a liquid crystalline compound.

(3) The compound according to item (1), wherein the divalent cyclic group is an aromatic ring, an aliphatic ling or heterocyclic ring.

(4) The compound according to item (1), wherein the divalent cyclic group is a 5-memberd ring, a 6-memberd ring, or a 7-membered ring.

(5) The compound according to item (1), wherein the polymerizable group comprises at least one of a functional group capable of causing an addition polymerization reaction and a functional group capable of causing an condensation polymerization reaction.

(6) The compound according to item (1), wherein the divalent linking group comprises at least one selected from the group consisting of —O—, —S—, —C(=O)—, —NR$_2$—, a divalent chain group and a divalent cyclic group.

(7) A liquid crystalline composition comprising a compound represented by the following formula (I):

Formula (I):

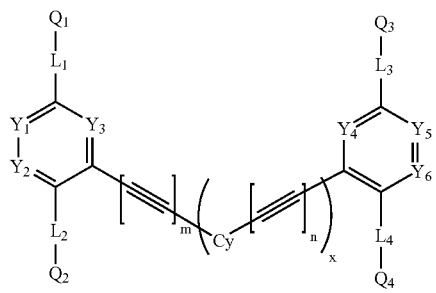

wherein Cy represents a divalent cyclic group, x represents an integer of 1 to 20, m and n each independently represent an integer of 1 to 4, $Y_1$ to $Y_6$ each independently represent methine or a nitrogen atom, $Q_1$ to $Q_4$ each independently represent a polymerizable group or a methyl group, and $L_1$ to $L_4$ each independently represent a divalent linking group.

(8) A retardation film comprising: a transparent support; an alignment film; and at least one optically anisotropic layer in this order, wherein the at least one optically anisotropic layer is formed from a compound represented by the following formula (I):

Formula (I):

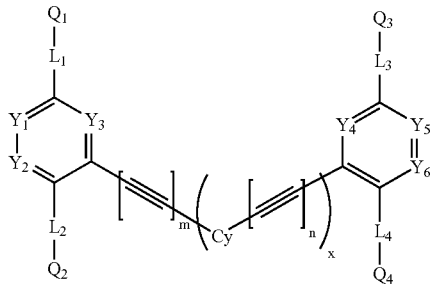

wherein Cy represents a divalent cyclic group, x represents an integer of 1 to 20, m and n each independently represent an integer of 1 to 4, $Y_1$ to $Y_6$ each independently represent methine or a nitrogen atom, $Q_1$ to $Q_4$ each independently represent a polymerizable group or a methyl group, and $L_1$ to $L_4$ each independently represent a divalent linking group.

The present invention can provide a liquid crystalline compound capable of exhibiting (or expressing) a biaxial liquid crystal phase, a trifunctional or greater functional polymerizable liquid crystalline compound having polymerizable groups, and a liquid crystalline composition and a retardation film which are using the liquid crystalline compound. The retardation film using the liquid crystalline compound of the present invention has desired optical anisotropy and excellent film strength. Furthermore, by using a biaxial liquid crystalline compound obtained in the present invention, a retardation film having optical performance unobtainable by the use of a uniaxial liquid crystalline compound can be obtained and when the retardation film using the biaxial liquid crystalline compound of the present invention is used as an optical compensatory sheet of a liquid crystal display, the display can be elevated in the contrast and reduced in the change of color.

DETAILED DESCRIPTION OF THE INVENTION

The present invention is described in detail below.
The compound represented by formula (I) is first described.

Formula (I):

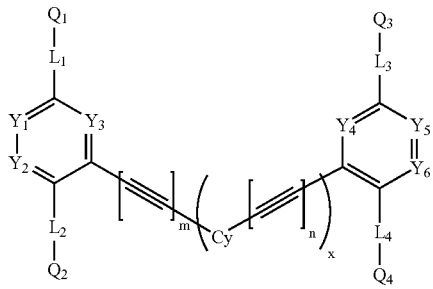

In formula (I), Cy is a divalent cyclic group. The ring contained in the cyclic group is preferably a 5-, 6- or 7-membered ring, more preferably a 5- or 6-membered ring, and most preferably a 6-membered ring. The ring contained in the cyclic group may be a condensed ring, but a monocyclic ring is more preferred than a condensed ring. Also, the ring contained in the cyclic group may be an aromatic ring, an aliphatic ring or a heterocyclic ring. Examples of the aromatic ring include a benzene ring and a naphthalene ring, examples of the aliphatic ring include a cyclohexane ring, and examples of the heterocyclic ring include a pyridine ring, a pyrimidine ring, a pyrazine ring, a pyridazine ring, a thiophene ring, a furan ring and a pyrrole ring.

Out of the divalent cyclic groups represented by Cy, the cyclic group having a benzene ring is preferably 1,4-phenylene or 1,3-phenylene, the cyclic group having a naphthalene ring is preferably naphthalene-1,5-diyl, naphthalene-1,3-diyl, naphthalene-1,4-diyl, naphthalene-2,5-diyl or naphthalene-2,6-diyl, the cyclic group having a cyclohexane ring is preferably 1,4-cyclohexylene or 1,3-cyclohexylene, the cyclic group having a pyridine ring is preferably pyridine-2,5-diyl, pyridine-3,5-diyl or pyridine-2,4-diyl, the cyclic group having a pyrazine ring is preferably pyrazine-2,5-diyl or pyrazine-2,6-diyl, the cyclic group having a pyridazine ring is preferably pyridazine-3,6-diyl or pyridazine-3,5-diyl, the cyclic group having a pyrimidine ring is preferably pyrimidine-4,6-diyl, pyrimidine-2,5-diyl or pyrimidine-2,4-diyl, the cyclic group having a thiophene ring is preferably thiophene-2,5-diyl, the cyclic group having a furan ring is preferably furan-2,5-diyl, and the cyclic group having a pyrrole ring is preferably pyrrole-2,5-diyl.

The cyclic group represented by Cy may have a substituent. Examples of the substituent include an alkyl group (e.g., methyl, ethyl, isopropyl, tert-butyl), an alkenyl (e.g., vinyl, allyl, 2-butenyl, 3-pentenyl), an alkynyl group (e.g., propargyl, 3-pentynyl), an aryl group (e.g., phenyl, p-methylphenyl, naphthyl), a substituted or unsubstituted amino group (e.g., unsubstituted amino, methylamino, dimethylamino, diethylamino, anilino), an alkoxy group (e.g., methoxy, ethoxy, butoxy), an aryloxy group (e.g., phenyloxy, 2-naphthyloxy), an acyl group (e.g., acetyl, benzoyl, formyl, pivaloyl), an alkoxycarbonyl group (e.g., methoxycarbonyl, ethoxycarbonyl), an aryloxycarbonyl group (e.g., phenyloxycarbonyl), an acyloxy group (e.g., acetoxy, benzoyloxy), an acylamino group (e.g., acetylamino, benzoylamino), an alkoxycarbonylamino group (e.g., methoxycarbonylamino), an aryloxycarbonylamino group (e.g., phenyloxycarbonylamino), an alkylsulfonylamino group (e.g., methanesulfonylamino), an arylsulfonylamino group (e.g., benzenesulfonylamino), a sulfamoyl group (e.g., sulfamoyl, N-methylsulfamoyl, N,N-dimethylsulfamoyl, N-phenylsulfamoyl), a carbamoyl group (e.g., unsubstituted carbamoyl, N-methylcarbamoyl, N,N-diethylcarbamoyl, N-phenylcarbamoyl), an alkylthio group (e.g., methylthio, ethylthio), an arylthio group (e.g., phenylthio), an alkylsulfonyl group (e.g., mesyl), an arylsulfonyl group (e.g., tosyl), an alkylsulfinyl group (e.g., methanesulfinyl), an arylsulfinyl group (e.g., benzenesulfinyl), a ureido group (e.g., unsubstituted ureido, 3-methylureido, 3-phenylureido), a phosphoric acid amido group (e.g., diethylphosphoric acid amido, phenylphosphoric acid amido), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (for example, a heterocyclic group having a heteroatom such as nitrogen atom, oxygen atom or sulfur atom; e.g., imidazolyl, pyridyl, quinolyl, furyl, piperidyl, morpholino, benzoxazolyl, benzimidazolyl, benzothiazolyl) and a silyl group (e.g., trimethylsilyl, triphenylsilyl). These substituents each may further be substituted by such a substituent.

Among these substituents of the cyclic group represented by Cy, preferred is an alkyl group, an alkoxy group, an aryloxy group, an acyl group, an alkoxycarbonyl group, an acyloxy group, an acylamino group, an alkoxy-carbonylamino group, an alkylthio group, an arylthio group or a halogen atom, and more preferred is an alkoxy group, an acyloxy group, an acylamino group or a halogen atom.

In formula (I), x is an integer of 1 to 20, preferably an integer of 1 to 10, more preferably an integer of 1 to 5. m and n each are independently an integer of 1 to 4, preferably an integer of 1 to 2. When x is an integer of 2 or more, multiple divalent cyclic groups represented by Cy in the compound of formula (I) may be different from each other and n's representing the number of —C≡C— bonded to the right side of each divalent cyclic group represented by Cy in formula (I) may be different from each other.

In formula (I), $Q_1$ to $Q_4$ each is independently a polymerizable group or a methyl group. In the case of using the compound represented by formula (I) for an optical film including the retardation film of the present invention, in which the phase difference is preferably not changed due to heat, such as optical compensatory film, it is preferred that at least two or more, more preferably three or more, and most preferably all, of $Q_1$ to $Q_4$ are a polymerizable group. The polymerization reaction is preferably addition polymerization (including ring-opening polymerization) or condensation polymerization. In other words, the polymerizable group is preferably a functional group capable of causing an addition polymerization reaction or a condensation polymerization reaction. Examples of the polymerizable group are set forth below.

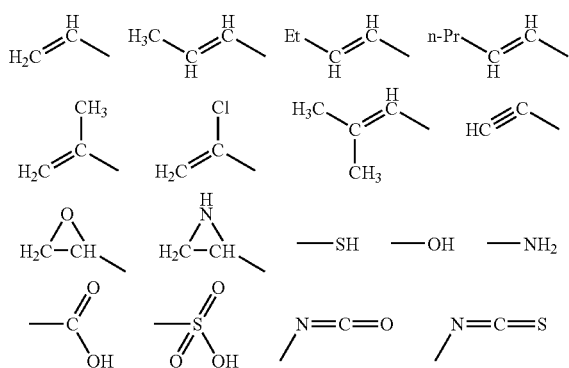

The polymerizable group is more preferably a functional group capable of causing an addition polymerization reaction and such a polymerizable group is preferably a polymerizable ethylenically unsaturated group or a ring-opening polymerizable group.

Examples of the polymerizable ethylenically unsaturated group include the compounds represented by the following formulae (M-1) to (M-6):

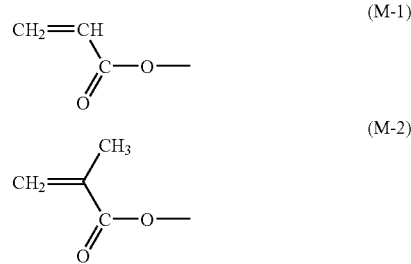

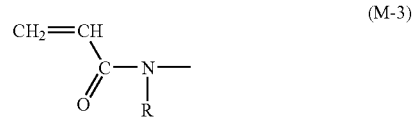

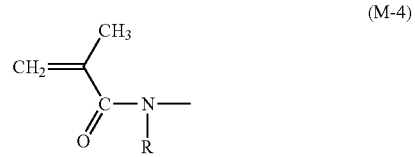

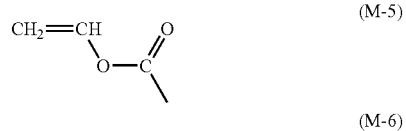

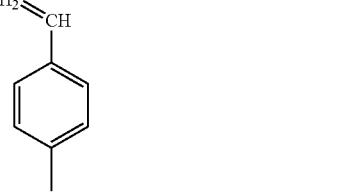

In formulae (M-3) and (M-4), R represents a hydrogen atom or a substituent. Examples of the substituent include those described above as the substituent which may be substituted to the cyclic group represented by Cy. R is preferably a hydrogen atom or an alkyl group, more preferably a hydrogen atom or a methyl group.

Among formulae (M-1) to (M-6), preferred are (M-1) or (M-2), and most preferred is (M-1).

The ring-opening polymerizable group is preferably a cyclic ether group, more preferably an epoxy group or an oxetanyl group, and most preferably an epoxy group.

In formula (I), $L_1$ to $L_4$ each are independently a divalent linking group. $L_1$ to $L_4$ each are independently preferably a divalent linking group selected from the group consisting of —O—, —S—, —C(=O)—, —$NR_2$—, a divalent chain group, a divalent cyclic group and a combination thereof. $R_2$ is an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

The divalent chain group represented by $L_1$ to $L_4$ is an alkylene group, a substituted alkylene group, an alkenylene group, a substituted alkenylene group, an alkynylene group or a substituted alkynylene group, preferably an alkylene group, a substituted alkylene group, an alkenylene group or a substituted alkenylene group, more preferably an alkylene group or an alkenylene group.

The alkylene group as the divalent chain group represented by $L_1$ to $L_4$ may have a branch. The carbon number of the alkylene group is preferably from 1 to 16, more preferably from 2 to 14, and most preferably from 2 to 12. The alkylene moiety in the substituted alkylene group is the same as the alkylene group described above and examples of the substituent includes a halogen atom.

The alkenylene group as the divalent chain group represented by $L_1$ to $L_4$ may have a substituted or unsubstituted alkylene group in the main chain or may have a branch. The carbon number of the alkenylene group is preferably from 2 to 16, more preferably from 2 to 14, and most preferably from 2 to 12. The alkenylene moiety in the substituted alkenylene group is the same as the alkenylene group described above and examples of the substituent includes a halogen atom.

The alkynylene group as the divalent chain group represented by $L_1$ to $L_4$ may have a substituted or unsubstituted alkylene group in the main chain. The carbon number of the alkynylene group is preferably from 2 to 16, more preferably from 2 to 14, and most preferably from 2 to 12. The alkynylene moiety in the substituted alkynylene group is the same as the alkynylene group described above and examples of the substituent includes a halogen atom.

Specific examples of the divalent chain group represented by $L_1$ to $L_4$ include ethylene, trimethylene, tetramethylene, 1-methyl-tetramethylene, pentamethylene, hexamethylene, octamethylene, nonamethylene, decamethylene, undecamethylene, dodecamethylene, 2-butenylene and 2-butynylene.

The divalent cyclic group represented by $L_1$ to $L_4$ is a divalent linking group having at least one cyclic structure. The divalent cyclic group is preferably a 5-, 6- or 7-membered ring, more preferably a 5- or 6-membered ring, and most preferably a 6-membered ring. The ring contained in the cyclic group may be a condensed ring, but a monocyclic ring is more preferred than a condensed ring. Also, the ring contained in the cyclic group may be an aromatic ring, an aliphatic ring or a heterocyclic ring. Examples of the aromatic ring include a benzene ring and a naphthalene ring, examples of the aliphatic ring include a cyclohexane ring, and examples of the heterocyclic ring include a pyridine ring and a pyrimidine ring.

Out of the divalent cyclic groups represented by $L_1$ to $L_4$, the cyclic group having a benzene ring is preferably 1,4-phenylene, the cyclic group having a naphthalene ring is preferably naphthalene-1,5-diyl or naphthalene-2,6-diyl, the cyclic group having a cyclohexane ring is preferably 1,4-cyclohexylene, the cyclic group having a pyridine ring is preferably pyridine-2,5-diyl, and the cyclic group having a pyrimidine ring is preferably pyrimidine-2,5-diyl.

The divalent cyclic group represented by $L_1$ to $L_4$ may have a substituent. Examples of the substituent include a halogen atom, a cyano group, a nitro group, an alkyl group having from 1 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms.

Out of the divalent linking groups represented by $L_1$ to $L_4$, examples of the divalent linking group comprising a combination of groups selected from —O—, —S—, —C(=O)—, —$NR_2$—, a divalent chain group and a divalent cyclic group are set forth below. In the following, the left side is bonded to Q ($Q_1$ to $Q_4$) and the right side is bonded to the benzene ring or heterocyclic ring.

L-1: —CO—O-divalent chain group-O-divalent cyclic group-
L-2: —CO—O-divalent chain group-O-divalent cyclic group-CO—O—
L-3: —CO—O-divalent chain group-O-divalent cyclic group-O-CO—
L-4: —CO—O-divalent chain group-O-divalent cyclic group-CO—$NR_2$—
L-5: —CO—O-divalent chain group-O-divalent cyclic group-divalent chain group-
L-6: —CO—O-divalent chain group-O-divalent cyclic group-divalent chain group-CO—O—
L-7: —CO—O-divalent chain group-O-divalent cyclic group-divalent chain group-O—CO—
L-8: —CO—O-divalent chain group-O—CO-divalent cyclic group-
L-9: —CO—O-divalent chain group-O—CO-divalent cyclic group-CO—O—
L-10: —CO—O-divalent chain group-O—CO-divalent cyclic group-O—CO—
L-11: —CO—O-divalent chain group-O—CO-divalent cyclic group-CO—$NR_2$—
L-12: —CO—O-divalent chain group-O—CO-divalent cyclic group-divalent chain group-
L-13: —CO—O-divalent chain group-O—CO-divalent cyclic group-divalent chain group-CO—O—
L-14: —CO—O-divalent chain group-O—CO-divalent cyclic group-divalent chain group-O—CO—
L-15: —CO—O-divalent chain group-CO—O-divalent cyclic group-
L-16: —CO—O-divalent chain group-CO—O-divalent cyclic group-CO—C—
L-17: —CO—O-divalent chain group-CO—O-divalent cyclic group-O—CO—
L-18: —CO—O-divalent chain group-CO—O-divalent cyclic group-CO—$NR_2$—
L-19: —CO—O-divalent chain group-CO—O-divalent cyclic group-divalent chain group-
L-20: —CO—O-divalent chain group-CO—O-divalent cyclic group-divalent chain group-CO—C—
L-21: —C—O-divalent chain group-CO—O-divalent cyclic group-divalent chain group-O—CO—
L-22: —CO—O-divalent chain group-O—CO—O-divalent cyclic group-
L-23: —CO—O-divalent chain group-O—CO—O-divalent cyclic group-CO—O—
L-24: —CO—O-divalent chain group-O—CO—O-divalent cyclic group-O—CO—
L-25: —CO—O-divalent chain group-O—CO—O-divalent cyclic group-CO—$NR_2$—
L-26: —CO—O-divalent chain group-O—CO—O-divalent cyclic group-divalent chain group-
L-27: —CO—O-divalent chain group-O—CO—O-divalent cyclic group-divalent chain group-CO—O—
L-28: —CO—O-divalent chain group-O—CO—O-divalent cyclic group-divalent chain group-O—CO—
L-29: -divalent chain group-O-divalent cyclic group-
L-30: -divalent chain group-O-divalent cyclic group-CO—O—
L-31: -divalent chain group-O-divalent cyclic group-O—CO—
L-32: -divalent chain group-O-divalent cyclic group-CO—$NR_2$—
L-33: -divalent chain group-O-divalent cyclic group-divalent chain group-
L-34: -divalent chain group-O-divalent cyclic group-divalent chain group-CO—O—
L-35: -divalent chain group-O-divalent cyclic group-divalent chain group-O—CO—
L-36: -divalent chain group-O—CO-divalent cyclic group-
L-37: -divalent chain group-O—CO-divalent cyclic group-CO—O—
L-38: -divalent chain group-O—CO-divalent cyclic group-O—CO—
L-39: -divalent chain group-O—CO-divalent cyclic group-CO—$NR_2$—
L-40: -divalent chain group-O—CO-divalent cyclic group-divalent chain group- L-41: -divalent chain group-O—CO-divalent cyclic group-divalent chain group-CO—O—
L-42: -divalent chain group-O—CO-divalent cyclic group-divalent chain group-O—CO—
L-43: -divalent chain group-CO—O-divalent cyclic group-
L-44: -divalent chain group-CO—O-divalent cyclic group-CO—O—
L-45: -divalent chain group-CO—O-divalent cyclic group-O—CO—
L-46: -divalent chain group-CO—O-divalent cyclic group-CO—$NR_2$—
L-47: -divalent chain group-CO—O-divalent cyclic group-divalent chain group-
L-48: -divalent chain group-CO—O-divalent cyclic group-divalent chain group-CO—O—
L-49: -divalent chain group-CO—O-divalent cyclic group-divalent chain group-O—CO—
L-50: -divalent chain group-O—CO—O-divalent cyclic group-
L-51: -divalent chain group-O—CO—O-divalent cyclic group-CO—O—
L-52: -divalent chain group-O—CO—O-divalent cyclic group-O—CO—
L-53: -divalent chain group-O—CO—O-divalent cyclic group-CO—$NR_2$—
L-54: -divalent chain group-O—CO—O-divalent cyclic group-divalent chain group-
L-55: -divalent chain group-O—CO—O-divalent cyclic group-divalent chain group-CO—O—
L-56: -divalent chain group-O—CO—O-divalent cyclic group-divalent chain group-O—CO—

Among these, preferred is L-2, L-3, L-9, L-10, L-16, L-17, L-23, L-24, L-30, L-31, L-37, L-38, L-41, L-42, L-44, L-45, L-51 or L-52.

In formula (I), $Y_1$ to $Y_6$ each independently represent methine or a nitrogen atom. $Y_3$ and $Y_4$ each are preferably methine and it is most preferred that $Y_1$ to $Y_6$ all are methine.

When $Y_1$ to $Y_6$ each are methine, the methine may have a substituent. Preferred examples of the substituent include those described above as the substituent which may be substituted to the cyclic group represented by Cy. These substituents each may be further substituted and examples of this substituent are also the same as those described above as the substituent which may be substituted to the cyclic group represented by Cy.

When $Y_1$, $Y_2$, $Y_5$ or $Y_6$ is methine, $Y_1$, $Y_2$, $Y_5$ or $Y_6$ may be a substituted methine. In this case, examples of the substituent include an alkyl group having from 1 to 16 carbon atoms, an alkoxy group having from 1 to 16 carbon atoms, a halogen atom (e.g., fluorine, chlorine, bromine, iodine), an acyl group having from 1 to 16 carbon atoms, an alkoxycarbonyl group having from 2 to 16 carbon atoms, an acyloxy group having from 1 to 16 carbon atoms, a carboxyl group, a cyano group, a hydroxy group, a mercapto group, a substituted or unsubstituted amino group and a nitro group. Among these, preferred is a fluorine-substituted or unsubstituted alkyl group having from 1 to 12 carbon atoms, a fluorine-substituted or unsubstituted alkoxy group having from 1 to 12 carbon atoms, a fluorine atom, a chlorine atom, a carboxyl group, a cyano group or a nitro group; and most preferred is a trifluoromethyl group, an unsubstituted alkyl group having from 1 to 12 carbon atoms, a trifluoromethyloxy group, an unsubstituted alkoxy group having from 1 to 12 carbon atoms, a fluorine atom, a carboxyl group, a cyano group or a nitro group. $Y_1$, $Y_2$, $Y_5$ and $Y_6$ each are most preferably an unsubstituted methine.

When $Y_3$ or $Y_4$ is methine, $Y_3$ or $Y_4$ may be a substituted methine. In this case, the substituent is preferably an alkyl group having from 1 to 6 carbon atoms, an alkoxy group having from 1 to 6 carbon atoms, a halogen atom (e.g., fluorine, chlorine, bromine, iodine), an acyl group having from 1 to 6 carbon atoms, an alkoxycarbonyl group having from 2 to 6 carbon atoms, an acyloxy group having from 1 to 6 carbon atoms or a cyano group, more preferably an alkyl group having from 1 to 4 carbon atoms or a halogen atom (e.g., fluorine, chlorine, bromine, iodine). When $Y_3$ or $Y_4$ is methine, $Y_3$ or $Y_4$ is most preferably an unsubstituted methine.

Among the compounds represented by formula (I), the compound represented by the following formula (II) is preferred because crystallization is hardly caused. The liquid crystalline compound is preferred to hardly undergo crystallization. As the compound less undergoes crystallization, the liquid crystal temperature range is more widened in dropping in temperature and therefore, a biaxial liquid crystal phase is more readily exhibited. In addition, the film can be more hardened at a low temperature by photopolymerization or the like, so that a high birefringence Δn can be expressed (or exhibited) and desired optical anisotropy can be easily obtained. Furthermore, also in the case of coating a liquid crystalline compound solution to produce a retardation film, a compound which readily undergoes crystallization brings about worsening of the film surface state due to crystallization of the liquid crystal compound at the evaporation of solvent. Therefore, it is preferred that crystallization is less caused.

Formula (II):

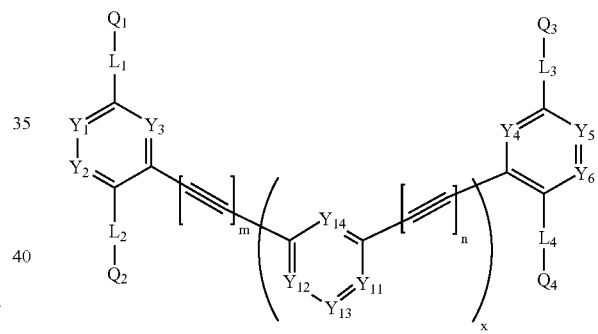

In formula (II), x, m, n, $Y_1$ to $Y_6$, $Q_1$ to $Q_4$ and $L_1$ to $L_4$ have the same meanings as in formula (I). In the compound of formula (II), when x is an integer of 2 or more, multiple divalent cyclic groups each containing $Y_{11}$ to $Y_{14}$ may be different from each other and n's representing the number of —C≡C— bonded to the right side of each divalent cyclic group containing $Y_{11}$, to $Y_{14}$ in formula (II) may be different from each other.

In formula (II), $Y_{11}$ to $Y_{14}$ each independently represent methine or a nitrogen atom. $Y_{11}$ to $Y_{14}$ each are preferably methine.

When $Y_{11}$ to $Y_{14}$ each are methine, the methine may have a substituent. Preferred examples of the substituent include those described above as the substituent which may be substituted to the cyclic group represented by Cy. These substituents each may be further substituted and examples of this substituent are also the same as those described above as the substituent which may be substituted to the cyclic group represented by Cy.

When $Y_{11}$ or $Y_{12}$ is methine, $Y_{11}$ or $Y_{12}$ may be a substituted methine. In this case, the substituent is preferably an alkyl group having from 1 to 6 carbon atoms, an alkoxy group having from 1 to 6 carbon atoms, a halogen atom (e.g., fluorine, chlorine, bromine, iodine), an acyl group having from 1 to 6 carbon atoms, an alkoxycarbonyl group having from 1 to 6 carbon atoms, an acyloxy group having from 1 to 6 carbon atoms or a cyano group, more preferably an alkyl group having from 1 to 4 carbon atoms or a halogen atom (e.g., fluorine, chlorine, bromine, iodine). When $Y_{11}$ or $Y_{12}$ are methine, $Y_{11}$ or $Y_{12}$ each is most preferably an unsubstituted methine.

$Y_{13}$ and $Y_{14}$ each are preferably an unsubstituted methine or a substituted methine. In this case, the substituent is preferably an alkyl group having from 1 to 16 carbon atoms, an alkoxy group having from 1 to 16 carbon atoms, a halogen atom (e.g., fluorine, chlorine, bromine, iodine), an acyl group having from 1 to 16 carbon atoms, an alkoxycarbonyl group having from 1 to 16 carbon atoms, an acyloxy group having from 1 to 16 carbon atoms or a substituted or unsubstituted amino group. The substituent may also be preferably -$L_1$-$Q_1$-, wherein -$L_1$-$Q_1$ has the same meaning as -$L_1$-$Q_1$ above. The substituent is more preferably an alkyl group having from 1 to 12 carbon atoms, an alkoxy group having from 1 to 12 carbon atoms, a fluorine atom, a chlorine atom or -$L_1$-$Q_1$.

-$L_1$-$Q_1$, -$L_2$-$Q_2$, -$L_3$-$Q_3$ and -$L_4$-$Q_4$ in formulae (I) and (II) each are more preferably a group represented by the following formula (III).

Formula (III):

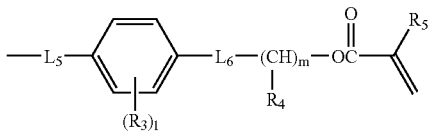

In formula (III), $L_5$ represents —CO—O—*, —O—CO—* or —O—CO—CH=CH—*, wherein * represents the position bonded to the benzene ring in formula (III).

$R_3$ represents a halogen atom (e.g., fluorine, chlorine, bromine, iodine), an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group, preferably a halogen atom (e.g., fluorine, chlorine, bromine, iodine), an alkyl group having from 1 to 3 carbon atoms, an alkyloxy group having from 1 to 3 carbon atoms, an acyl group having from 2 to 4 carbon atoms, an acyloxy group having from 2 to 4 carbon atoms, an alkoxycarbonyl group having from 2 to 4 carbon atoms or a cyano group. l represents an integer of 0 to 4, preferably 0 or 1, and most preferably 0. When l is 2 or more, multiple groups represented by $R_3$ may be different from each other.

$L_6$ represents *—O—, *—CO—O—, *—O—CO—, *—O—CO—O— or *—CH$_2$—, wherein * represents the position bonded to the benzene ring in formula (III).

$R_4$ represents a hydrogen atom, a methyl group, an ethyl group or a propyl group, preferably a hydrogen atom or a methyl group, and most preferably a hydrogen atom.

m represents an integer of 2 to 16, preferably an integer of 2 to 12.

$R_5$ represents a hydrogen atom or a methyl group, preferably a hydrogen atom.

Among the compounds represented by formula (I), the compound represented by the following formulae (IV) or (V) is preferred, and the compound represented by formula (V) is more preferred.

Formula (IV):

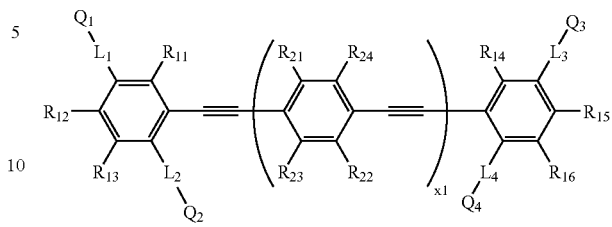

Formula (V):

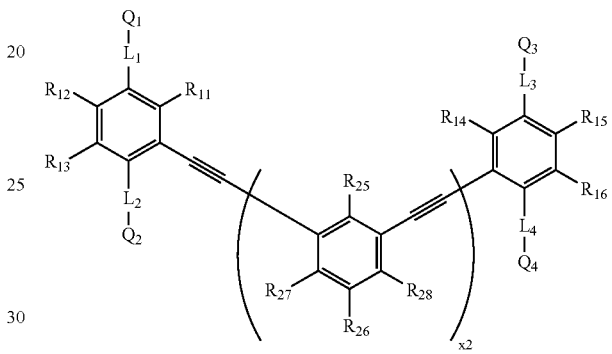

In formulae (IV) and (V), $Q_1$ to $Q_4$ and $L_1$ to $L_4$ have the same meanings as in formula (I). -$L_1$-$Q_1$, -$L_2$-$Q_2$, -$L_3$-$Q_3$ and -$L_4$-$Q_4$ each are preferably a group represented by formula (III). $R_{12}$, $R_{13}$, $R_{15}$ and $R_{16}$ each represent a hydrogen atom, a fluorine-substituted or unsubstituted alkyl group having from 1 to 12 carbon atoms, a fluorine-substituted or unsubstituted alkoxy group having from 1 to 12 carbon atoms, a fluorine atom, a chlorine atom, a carboxyl group, a cyano group or a nitro group, preferably a hydrogen atom. $R_{11}$ and $R_{14}$ each represent a hydrogen atom, an alkyl group having from 1 to 6 carbon atoms, an alkoxy group having from 1 to 6 carbon atoms, a halogen atom (e.g., fluorine, chlorine, bromine, iodine), an acyl group having from 1 to 6 carbon atoms, an alkoxycarbonyl group having from 2 to 6 carbon atoms, an acyloxy group having from 1 to 6 carbon atoms or a cyano group, preferably a hydrogen atom, an alkyl group having from 1 to 4 carbon atoms or a halogen atom (e.g., fluorine, chlorine, bromine, iodine), and most preferably a hydrogen atom. $R_{23}$, $R_{24}$, $R_{27}$ and $R_{28}$ each have the same meaning as $R_{12}$. $R_{21}$, $R_{22}$, $R_{25}$ and $R_{26}$ each represent a hydrogen atom, an alkyl group having from 1 to 16 carbon atoms, an alkoxy group having from 1 to 16 carbon atoms, a halogen atom (e.g., fluorine, chlorine, bromine, iodine), an acyl group having from 1 to 16 carbon atoms, an alkoxycarbonyl group having from 1 to 16 carbon atoms, an acyloxy group having from 1 to 16 carbon atoms, a substituted or unsubstituted amino group or a group represented by formula (III), preferably a hydrogen atom or a group represented by formula (III). x1 and x2 each represents an integer of 1 to 5, preferably an integer of 1 to 3.

Specific examples of the compound represented by formula (I) are set forth below, but the present invention is not limited thereto.

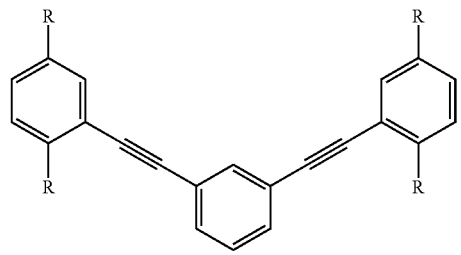
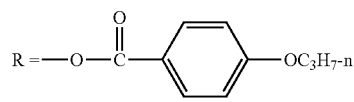
T-1
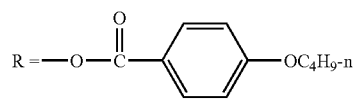
T-2
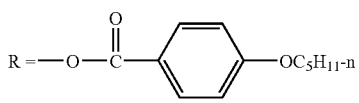
T-3
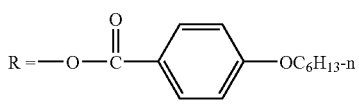
T-4
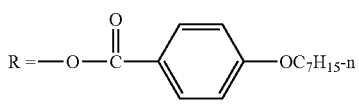
T-5
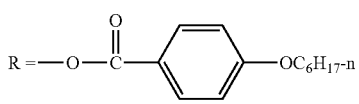
T-6
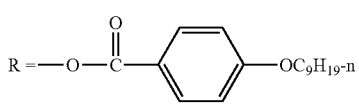
T-7
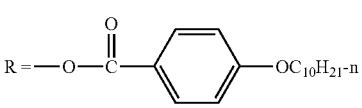
T-8

-continued
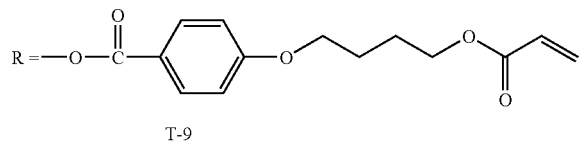
T-9
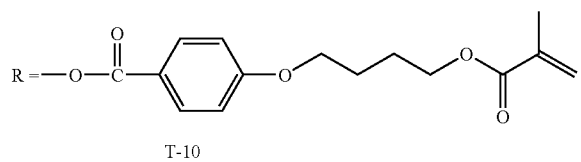
T-10
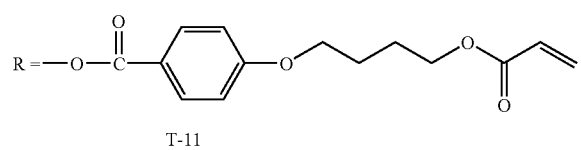
T-11
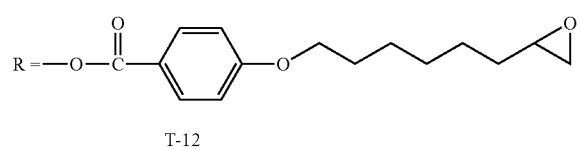
T-12
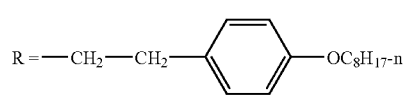
T13
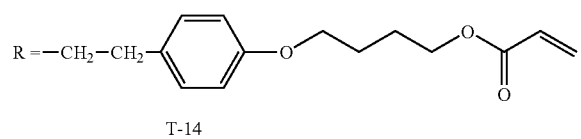
T-14
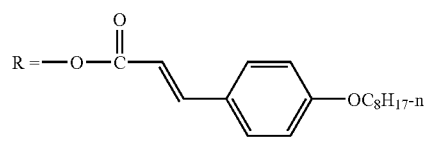
T-15
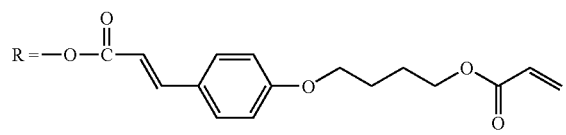
T-16
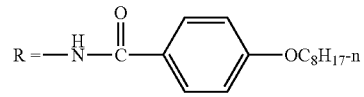
T-17

-continued
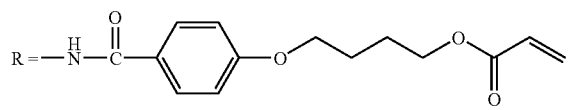
T-18
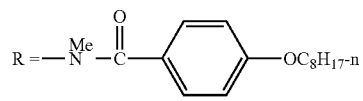
T-19
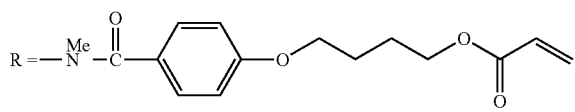
T-20
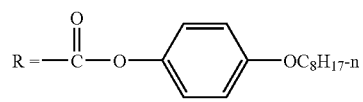
T-21
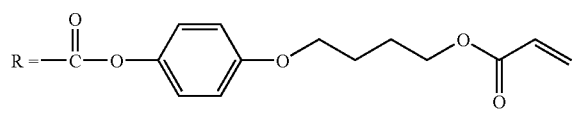
T-22
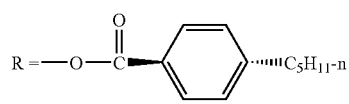
T-23
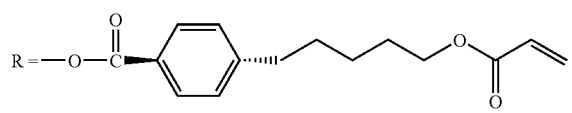
T-24
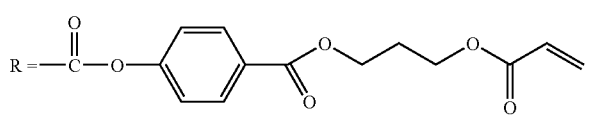
T-25
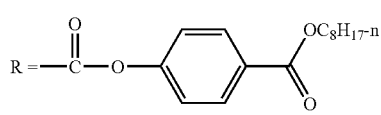
T-26
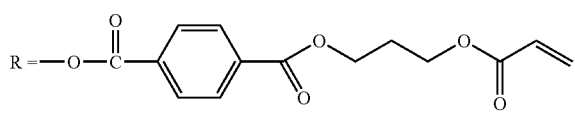
T-27

-continued
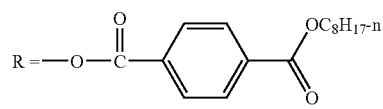
T-28
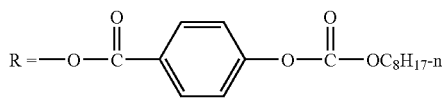
T-29
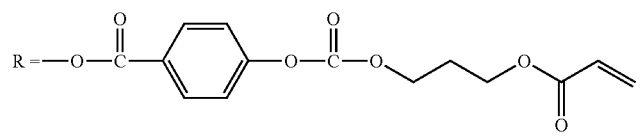
T-30
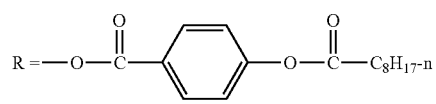
T-31
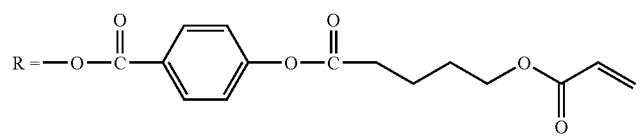
T-32
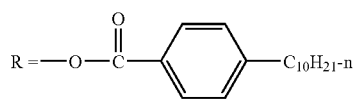
T-33
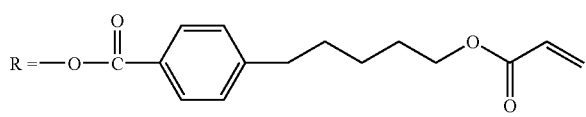
T-34
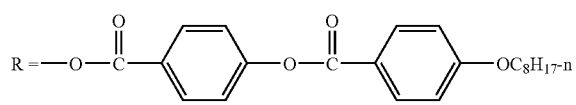
T-35
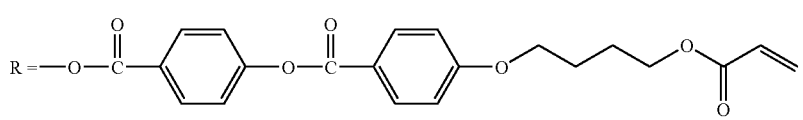
T-36

-continued
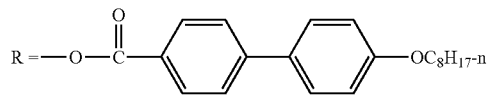
T-37
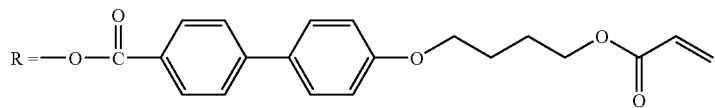
T-38
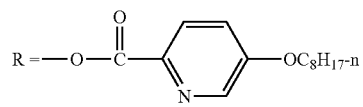
39
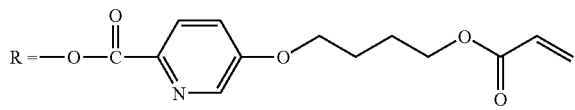
T-40
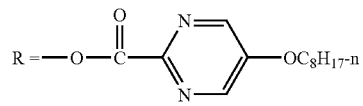
T-41
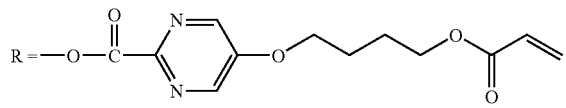
T-42
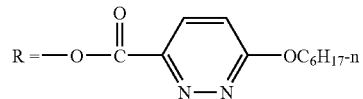
T-43
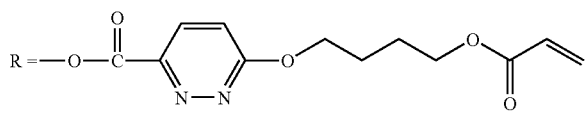
T-44
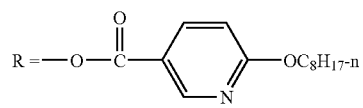
T-45
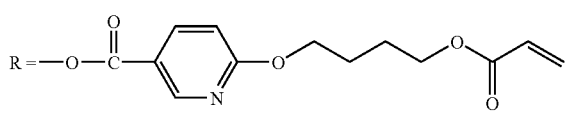
T-46

-continued
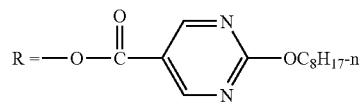
T-47
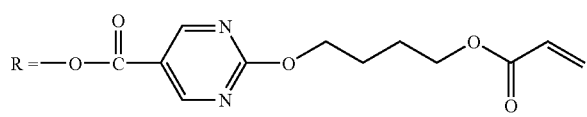
T-48
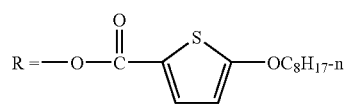
T-49
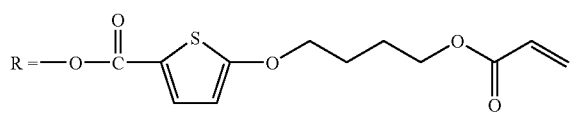
T-50
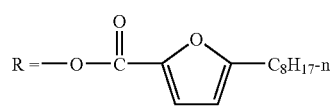
T-51
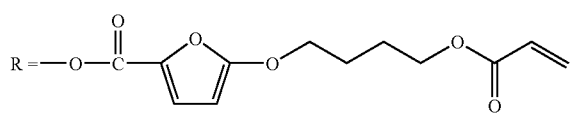
T-52
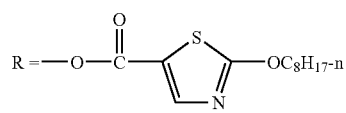
T-53
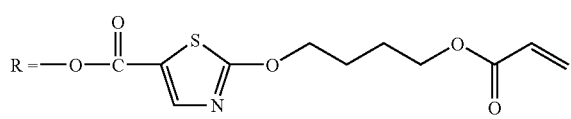
T-54
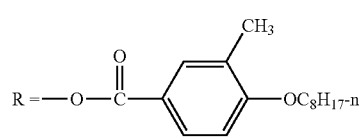
T-55

-continued
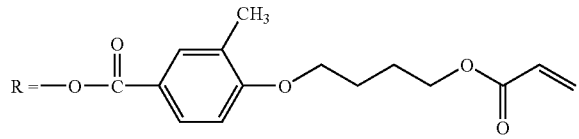
T-56
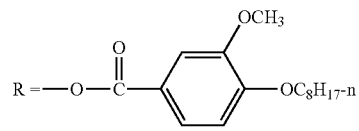
T-57
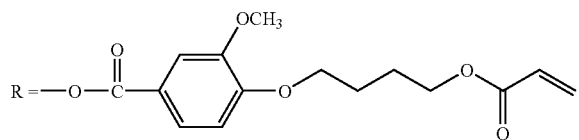
T-58
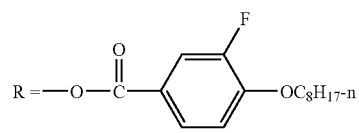
T-59
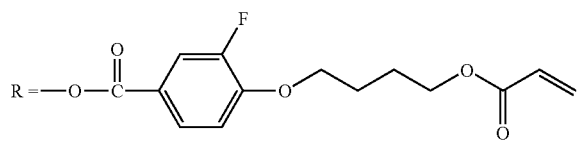
T-60
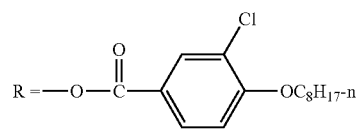
T-61
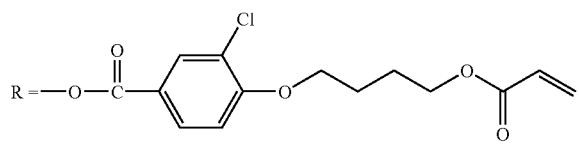
T-62
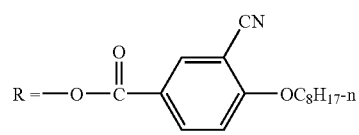
T-63

-continued
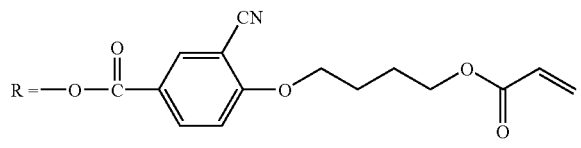
T-64
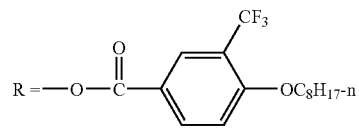
T-65
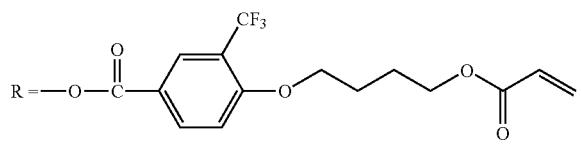
T-66
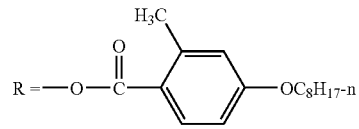
T-67
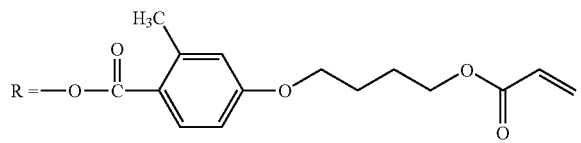
T-68
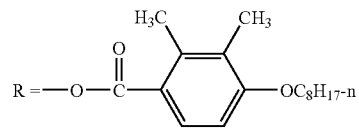
T-69
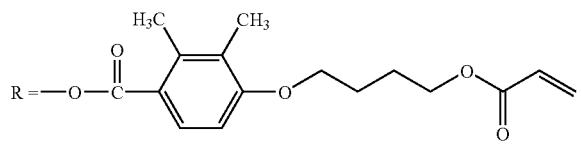
T-70
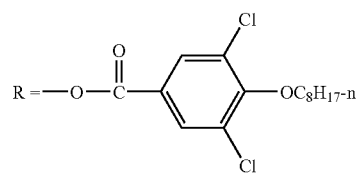
T-71

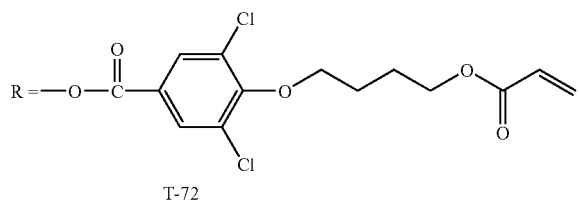
T-72
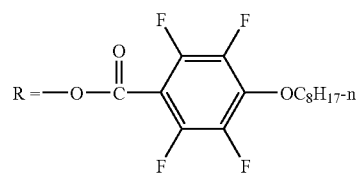
T-73
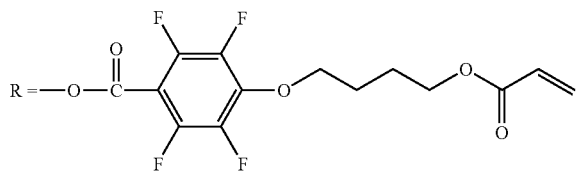
T-74
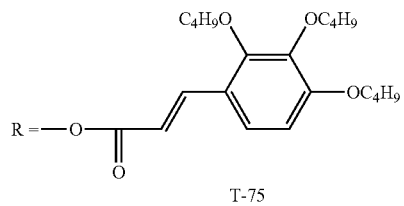
T-75
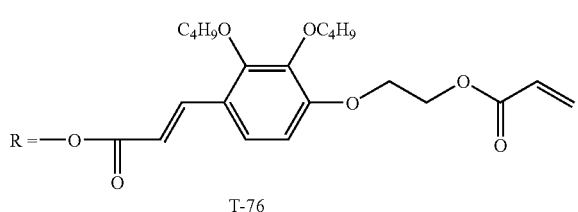
T-76
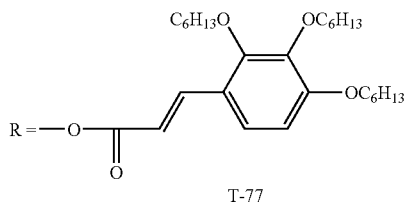
T-77
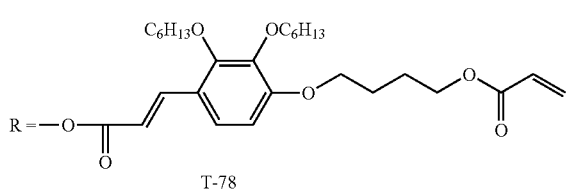
T-78

-continued
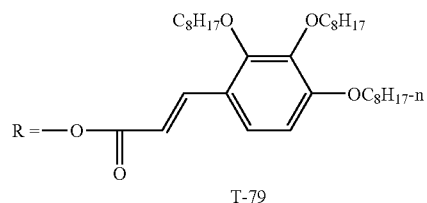
T-79
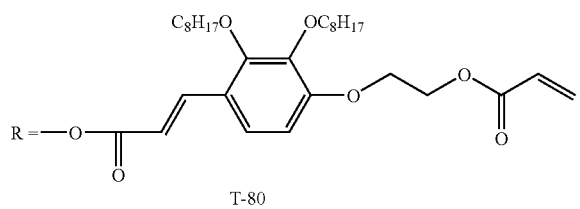
T-80
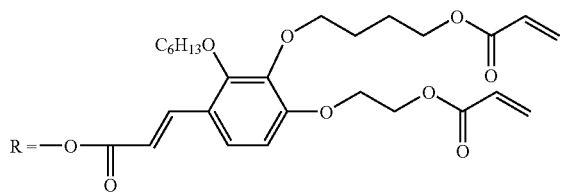
T-81
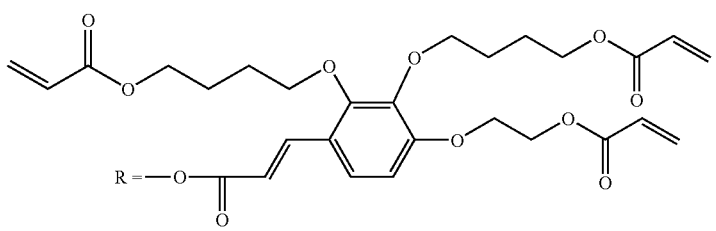
T-82
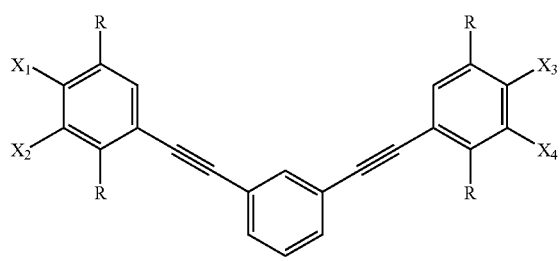
| | R | $X_1$ | $X_2$ | $X_3$ | $X_4$ |
|---|---|---|---|---|---|
| T-83 | 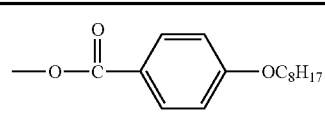 | CN | H | H | H |
| T-84 | 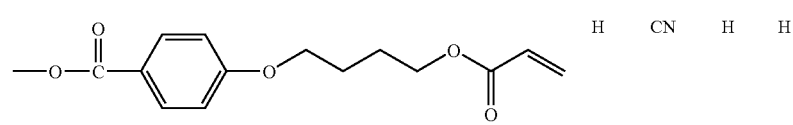 | H | CN | H | H |
| T-85 | 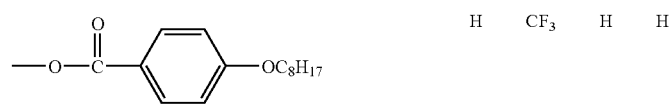 | H | $CF_3$ | H | H |

-continued
| | | | | | |
|---|---|---|---|---|---|
| T-86 | ![structure] | CF₃ | H | H | H |
| T-87 | ![structure] | F | H | H | H |
| T-88 | ![structure] | H | F | H | H |
| T-89 | ![structure] | H | Cl | H | H |
| T-90 | ![structure] | Cl | H | H | H |
| T-91 | ![structure] | Br | H | H | H |
| T-92 | ![structure] | H | Br | H | H |
| T-93 | ![structure] | H | COOH | H | H |
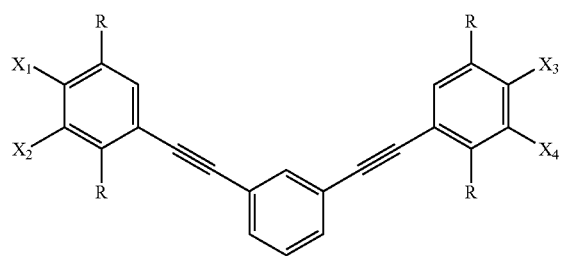
| | R | $X_1$ | $X_2$ | $X_3$ | $X_4$ |
|---|---|---|---|---|---|
| T-94 | ![structure] | COOH | H | H | H |
| T-95 | ![structure] | Me | H | H | H |

-continued
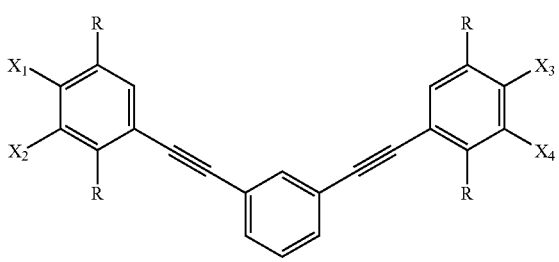
|  | R | $X_1$ | $X_2$ | $X_3$ | $X_4$ |
|---|---|---|---|---|---|
| T-96 | 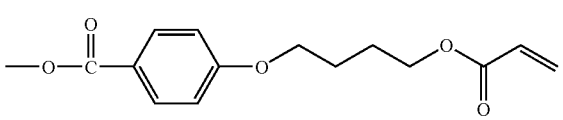 | H | Me | H | H |
| T-97 | 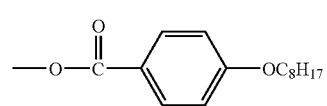 | OMe | H | H | H |
| T-98 | 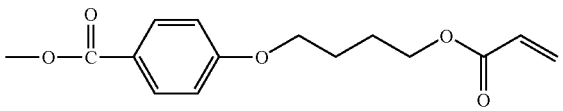 | H | OMe | H | H |
| T-99 | 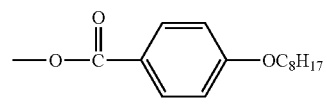 | $OC_6H_{13}$ | H | H | H |
| T-100 | 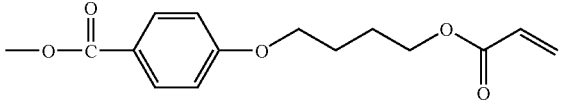 | H | $OC_6H_{13}$ | H | H |
| T-101 | 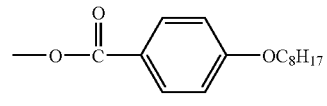 | $NHCOCH_3$ | H | H | H |
| T-102 | 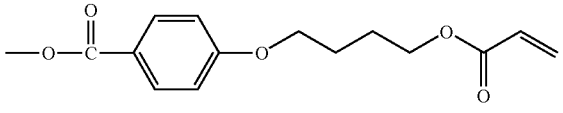 | H | $NHCOCH_3$ | H | H |
| T-103 | 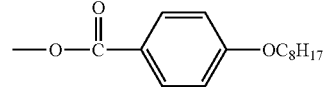 | CN | CN | H | H |
| T-104 | 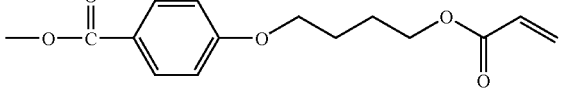 | CN | CN | H | H |

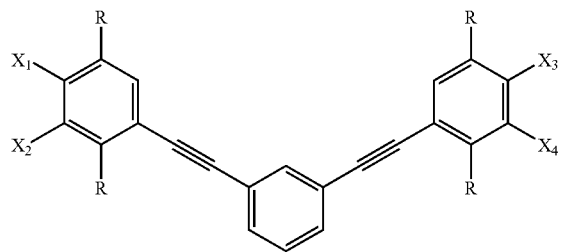
| | R | $X_1$ | $X_2$ | $X_3$ | $X_4$ |
|---|---|---|---|---|---|
| T-105 | —O—C(=O)—C₆H₄—OC₈H₁₇ | CF₃ | CF₃ | H | H |
| T-106 | —O—C(=O)—C₆H₄—O—(CH₂)₄—O—C(=O)—CH=CH₂ | CF₃ | CF₃ | H | H |
| T-107 | —O—C(=O)—C₆H₄—OC₈H₁₇ | F | F | H | H |
| T-108 | —O—C(=O)—C₆H₄—O—(CH₂)₄—O—C(=O)—CH=CH₂ | F | F | H | H |
| T-109 | —O—C(=O)—C₆H₄—OC₈H₁₇ | Cl | Cl | H | H |
| T-110 | —O—C(=O)—C₆H₄—O—(CH₂)₄—O—C(=O)—CH=CH₂ | Cl | Cl | H | H |
| T-111 | —O—C(=O)—C₆H₄—OC₈H₁₇ | Br | Br | H | H |
| T-112 | —O—C(=O)—C₆H₄—O—(CH₂)₄—O—C(=O)—CH=CH₂ | Br | Br | H | H |
| T-113 | —O—C(=O)—C₆H₄—OC₈H₁₇ | COOH | COOH | H | H |
| T-114 | —O—C(=O)—C₆H₄—O—(CH₂)₄—O—C(=O)—CH=CH₂ | COOH | COOH | H | H |

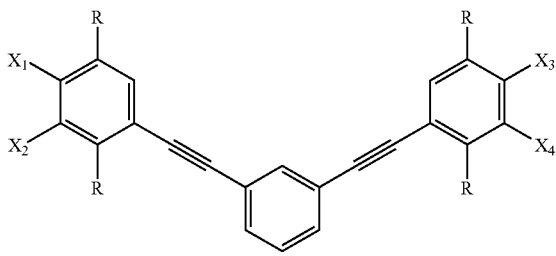

|  | R | $X_1$ | $X_2$ | $X_3$ | $X_4$ |
|---|---|---|---|---|---|
| T-115 | —O—C(=O)—C₆H₄—OC₈H₁₇ | Me | Me | H | H |
| T-116 | —O—C(=O)—C₆H₄—O—(CH₂)₄—O—C(=O)—CH=CH₂ | Me | Me | H | H |
| T-117 | —O—C(=O)—C₆H₄—OC₈H₁₇ | OMe | OMe | H | H |
| T-118 | —O—C(=O)—C₆H₄—O—(CH₂)₄—O—C(=O)—CH=CH₂ | OMe | OMe | H | H |
| T-120 | —O—C(=O)—C₆H₄—O—(CH₂)₄—O—C(=O)—CH=CH₂ | $OC_6H_{13}$ | $OC_6H_{13}$ | H | H |
| T-121 | —O—C(=O)—C₆H₄—OC₈H₁₇ | $NHCOCH_3$ | $NHCOCH_3$ | H | H |
| T-122 | —O—C(=O)—C₆H₄—O—(CH₂)₄—O—C(=O)—CH=CH₂ | $NHCOCH_3$ | $NHCOCH_3$ | H | H |
| T-123 | —O—C(=O)—C₆H₄—OC₈H₁₇ | CN | H | CN | H |
| T-124 | —O—C(=O)—C₆H₄—O—(CH₂)₄—O—C(=O)—CH=CH₂ | H | CN | H | CN |
| T-125 | —O—C(=O)—C₆H₄—OC₈H₁₇ | $CF_3$ | H | $CF_3$ | H |

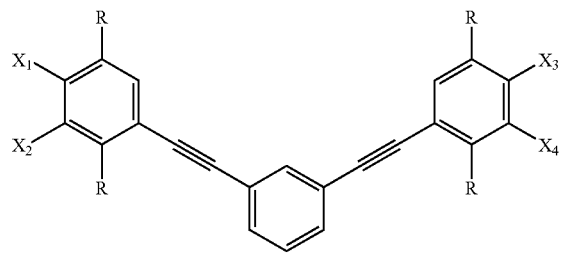
|       | R | $X_1$ | $X_2$ | $X_3$ | $X_4$ |
|-------|---|-------|-------|-------|-------|
| T-126 | | H | $CF_3$ | H | $CF_3$ |
| T-127 | | F | H | F | H |
| T-128 | | H | F | F | H |
| T-129 | | Cl | H | Cl | H |
| T-130 | | H | Cl | Cl | Cl |
| T-131 | | Br | H | Br | H |
| T-132 | | Br | Br | Br | H |
| T-133 | | COOH | H | COOH | H |
| T-134 | | H | COOH | H | COOH |
| T-135 | | Me | H | Me | H |

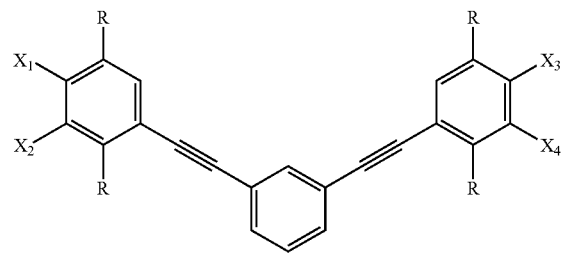

| | | R | X₁ | X₂ | X₃ | X₄ |
|---|---|---|---|---|---|---|
| T-136 | (acrylate ester structure) | | Me | Me | Me | H |
| T-137 | (OC₈H₁₇ ester structure) | | OMe | H | OMe | H |
| T-138 | (acrylate ester structure) | | H | OMe | OMe | H |
| T-139 | (OC₈H₁₇ ester structure) | | OC₆H₁₃ | H | OC₆H₁₃ | H |
| T-140 | (acrylate ester structure) | | H | OC₆H₁₃ | H | OC₆H₁₃ |
| T-141 | (OC₈H₁₇ ester structure) | | NHCOCH₃ | H | NHCOCH₃ | H |
| T-142 | (acrylate ester structure) | | H | NHCOCH₃ | H | NHCOCH₃ |
| T-143 | (OC₈H₁₇ ester structure) | | CN | CN | CN | CN |
| T-144 | (acrylate ester structure) | | CN | CN | CN | CN |
| T-145 | (OC₈H₁₇ ester structure) | | CF₃ | CF₃ | CF₃ | CF₃ |

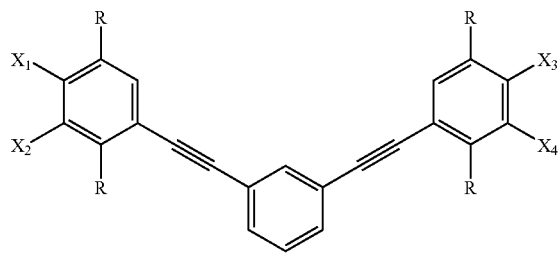

| | R | $X_1$ | $X_2$ | $X_3$ | $X_4$ |
|---|---|---|---|---|---|
| T-146 | —O—C(=O)—C₆H₄—O—(CH₂)₄—O—C(=O)—CH=CH₂ | $CF_3$ | $CF_3$ | $CF_3$ | $CF_3$ |
| T-147 | —O—C(=O)—C₆H₄—OC₈H₁₇ | F | F | F | F |
| T-148 | —O—C(=O)—C₆H₄—O—(CH₂)₄—O—C(=O)—CH=CH₂ | F | F | F | F |
| T-149 | —O—C(=O)—C₆H₄—OC₈H₁₇ | Cl | Cl | Cl | Cl |
| T-150 | —O—C(=O)—C₆H₄—O—(CH₂)₄—O—C(=O)—CH=CH₂ | Cl | Cl | Cl | Cl |
| T-151 | —O—C(=O)—C₆H₄—OC₈H₁₇ | Br | Br | Br | Br |
| T-152 | —O—C(=O)—C₆H₄—O—(CH₂)₄—O—C(=O)—CH=CH₂ | Br | Br | Br | Br |
| T-153 | —O—C(=O)—C₆H₄—OC₈H₁₇ | COOH | COOH | COOH | COOH |
| T-154 | —O—C(=O)—C₆H₄—O—(CH₂)₄—O—C(=O)—CH=CH₂ | COOH | COOH | COOH | COOH |
| T-155 | —O—C(=O)—C₆H₄—OC₈H₁₇ | Me | Me | Me | Me |
| T-156 | —O—C(=O)—C₆H₄—O—(CH₂)₄—O—C(=O)—CH=CH₂ | Me | Me | Me | Me |

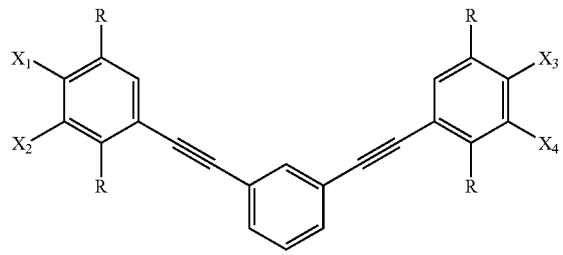
|  | R | $X_1$ | $X_2$ | $X_3$ | $X_4$ |
|---|---|---|---|---|---|
| T-157 | —O−C(=O)−C6H4−OC8H17 | OMe | OMe | OMe | OMe |
| T-158 | —O−C(=O)−C6H4−O−(CH2)4−O−C(=O)−CH=CH2 | OMe | OMe | OMe | OMe |
| T-159 | —O−C(=O)−C6H4−OC8H17 | OC6H13 | OC6H13 | OC6H13 | OC6H13 |
| T-160 | —O−C(=O)−C6H4−O−(CH2)4−O−C(=O)−CH=CH2 | OC6H13 | OC6H13 | OC6H13 | OC6H13 |
| T-161 | —O−C(=O)−C6H4−OC8H17 | NHCOCH3 | NHCOCH3 | NHCOCH3 | NHCOCH3 |
| T-162 | —O−C(=O)−C6H4−O−(CH2)4−O−C(=O)−CH=CH2 | NHCOCH3 | NHCOCH3 | NHCOCH3 | NHCOCH3 |
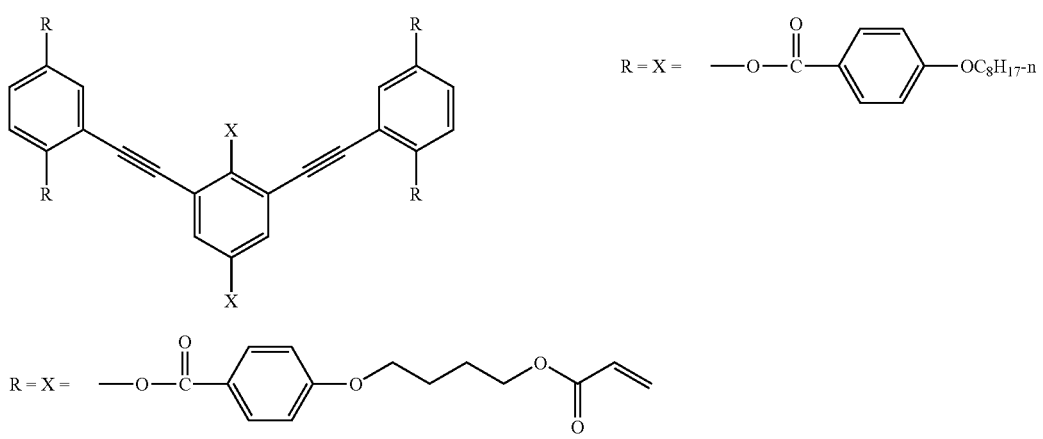
T-163
T-164

-continued
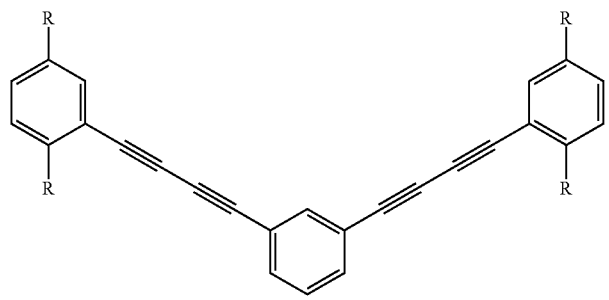
T-165
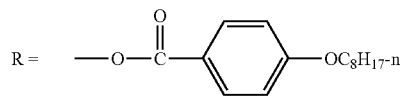
T-166
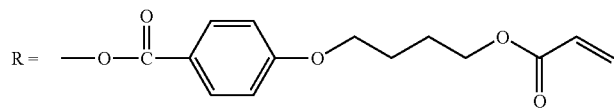
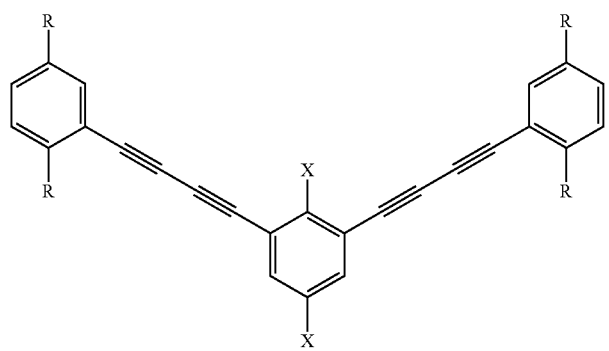
T-167
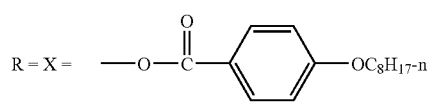
T-168
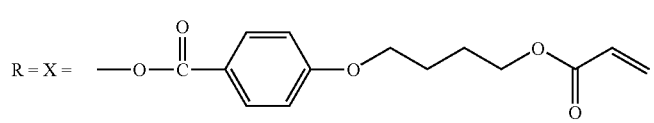
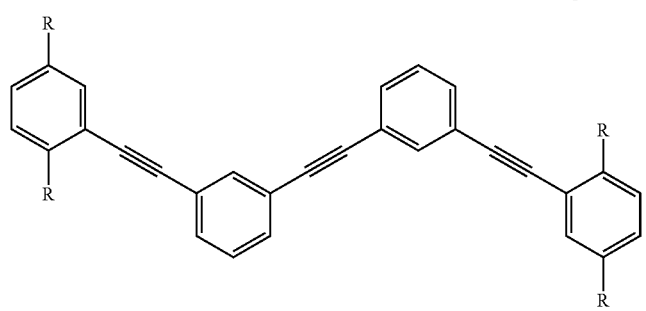
T-169
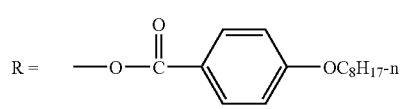
T-170
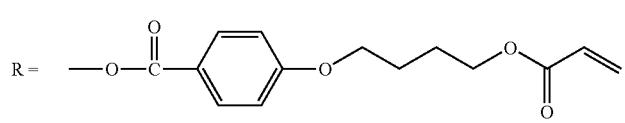

-continued
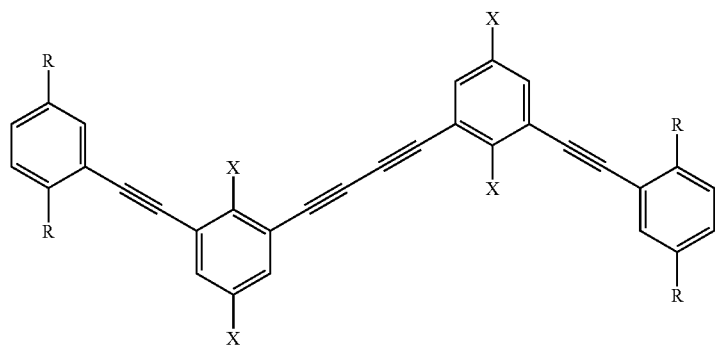
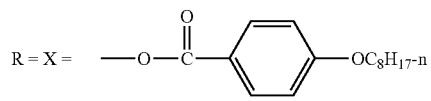
T-171
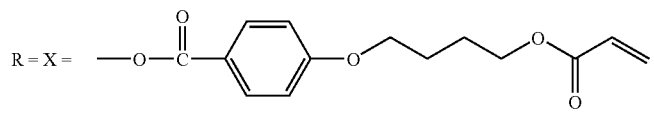
T-172
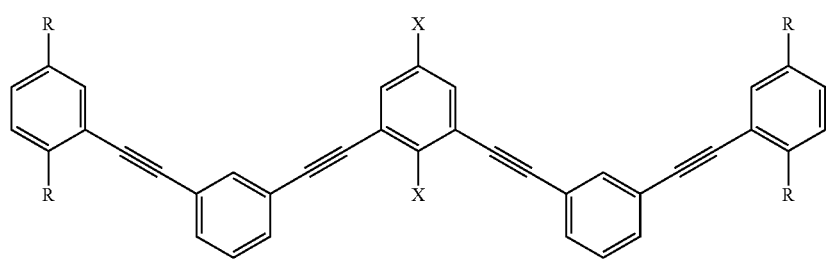
T-173
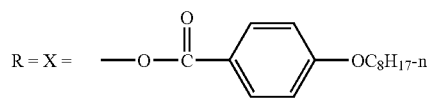
T-174
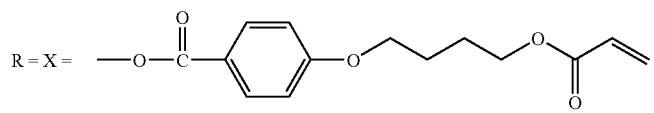
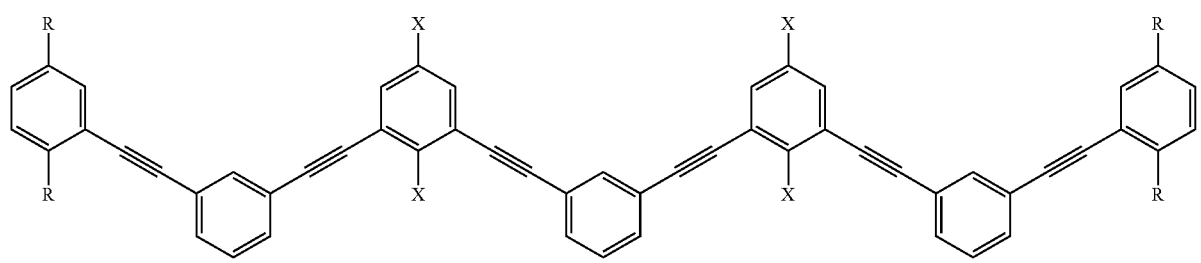
T-175
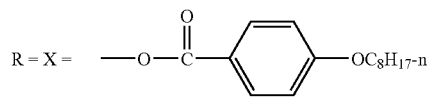
T-176
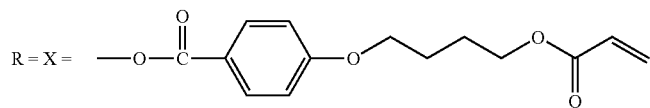

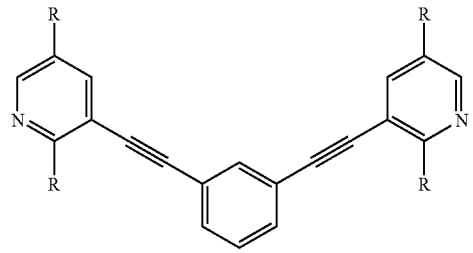 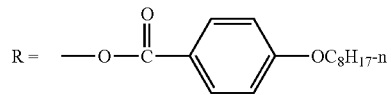
T-177
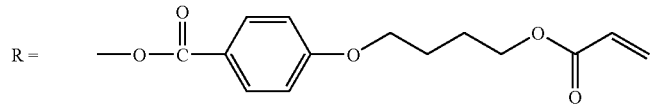
T-178
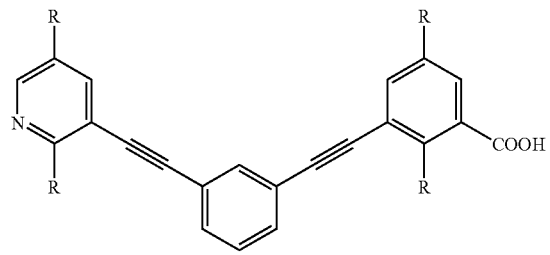 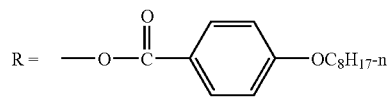
T-179
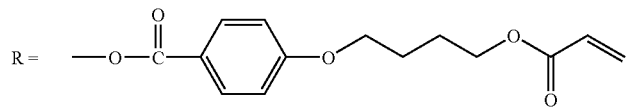
T-180
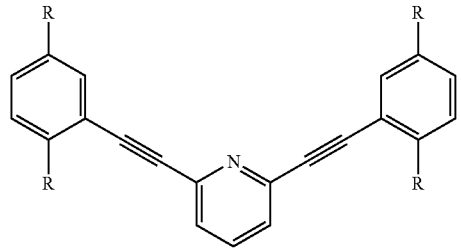 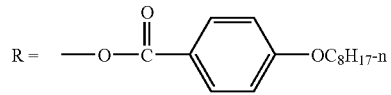
T-181
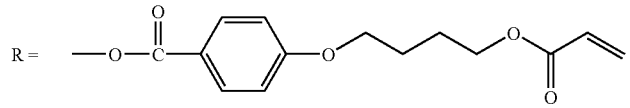
T-182
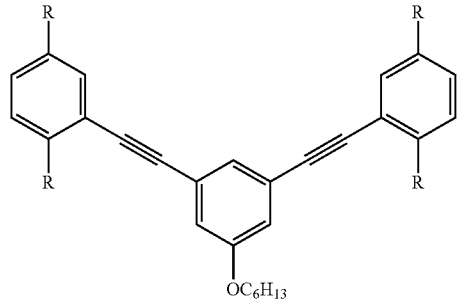 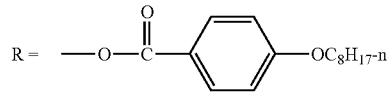
T-183
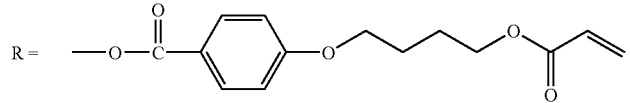
T-184

-continued
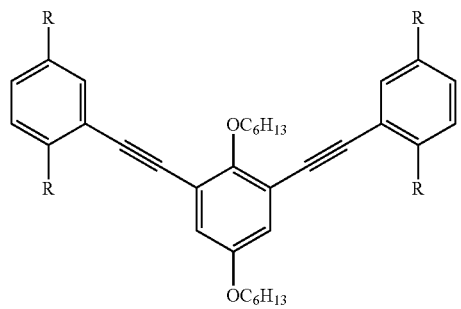
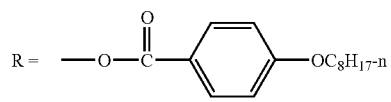
T-185
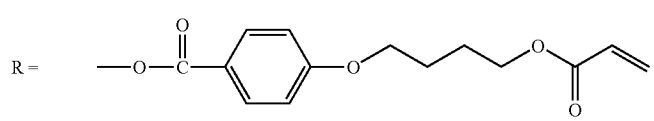
T-186
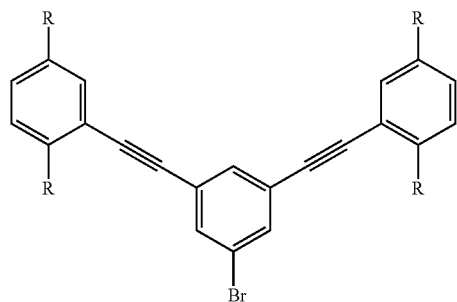
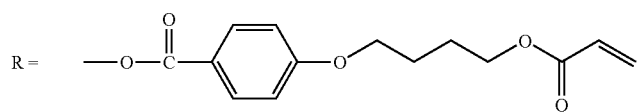
T-187
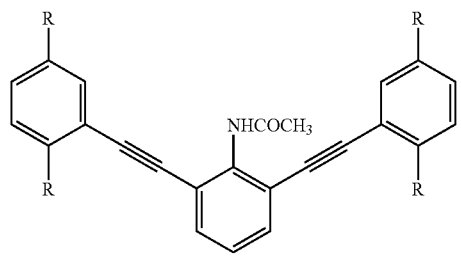
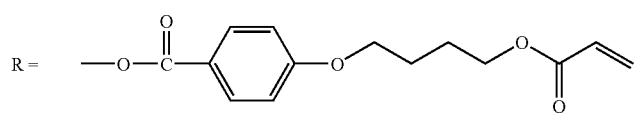
T-188
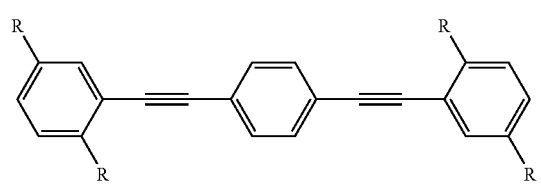
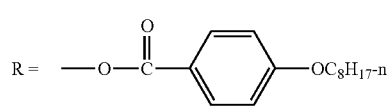
T-189
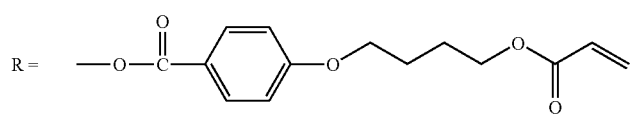
T-190

-continued
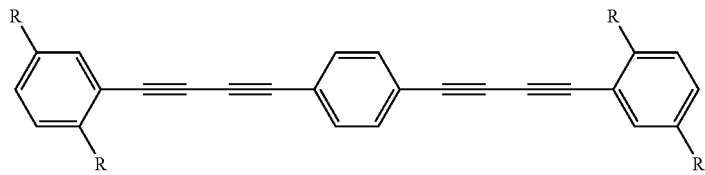
T-191
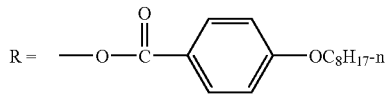
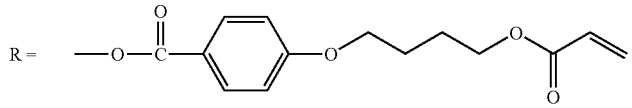
T-192
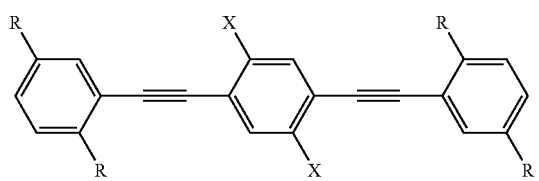
T-193
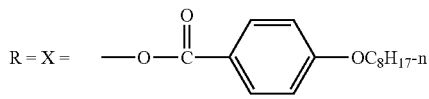
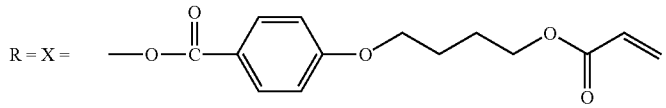
T-194
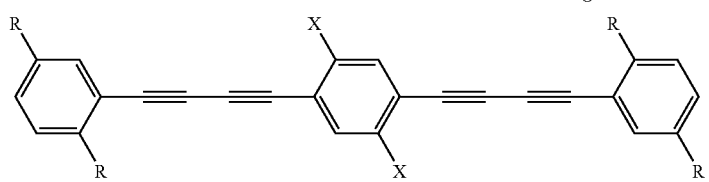
T-195
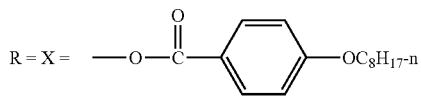
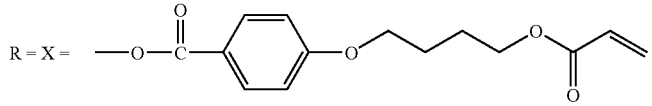
T-196
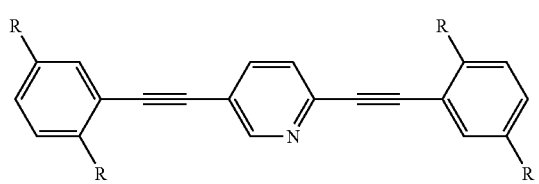
T-197
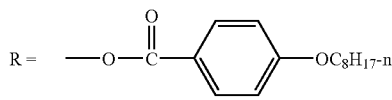
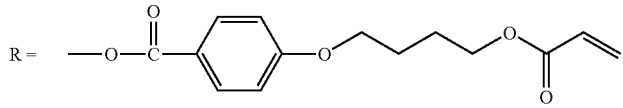
T-198

-continued
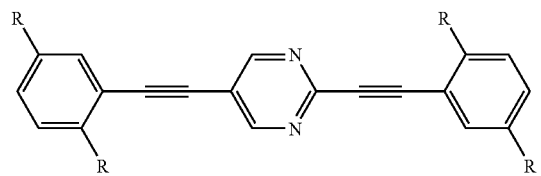
T-199
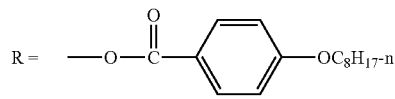
T-200
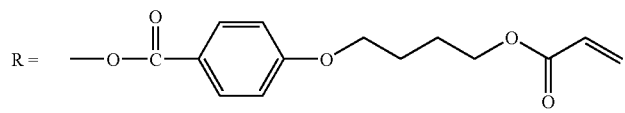
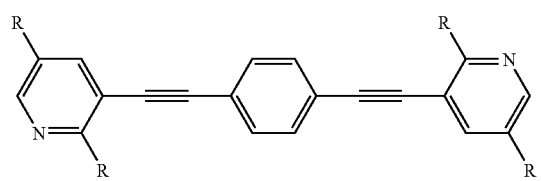
T-201
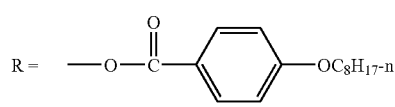
T-202
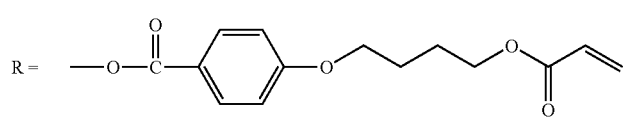
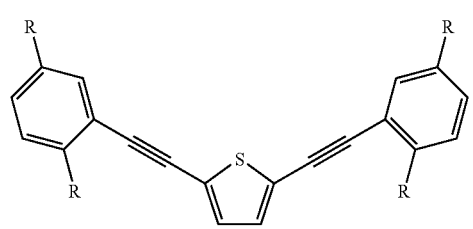
T-203
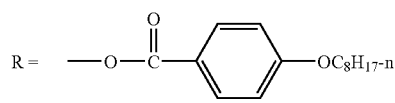
T-204
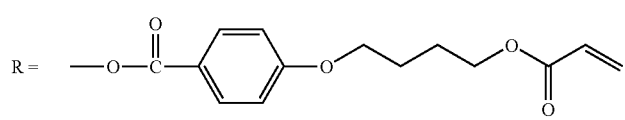
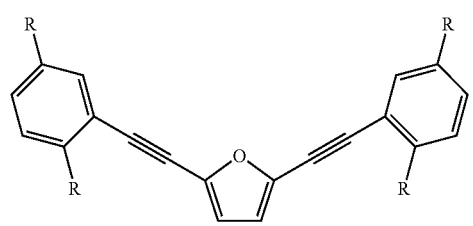
T-205
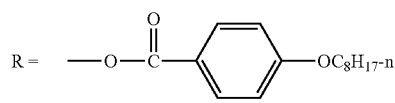

-continued
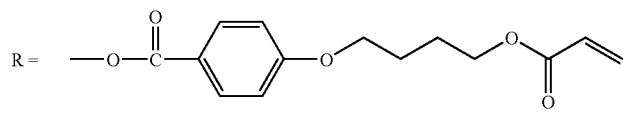
T-206
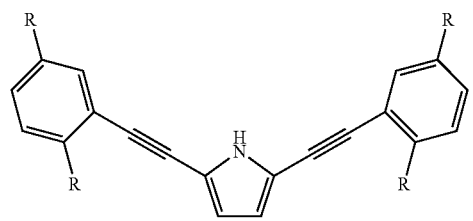
T-207
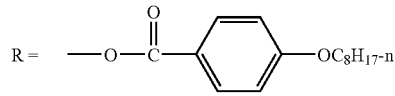
T-208
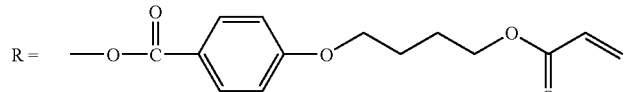
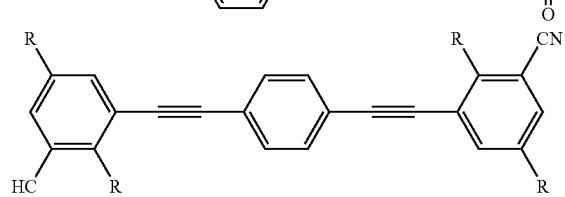
T-209
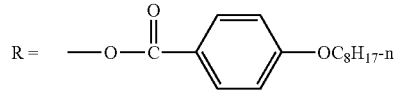
T-210
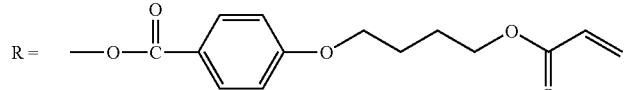
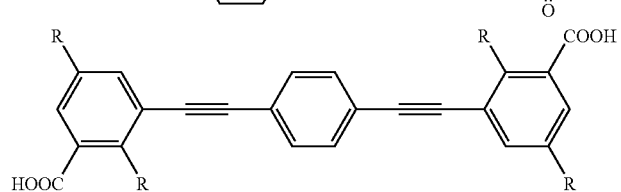
T-211
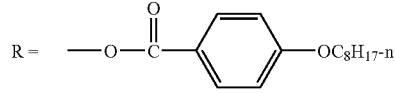
T-212
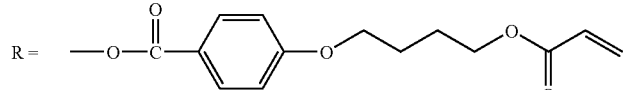
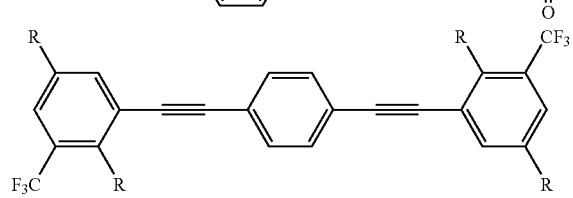
T-213
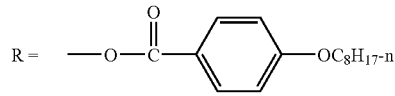

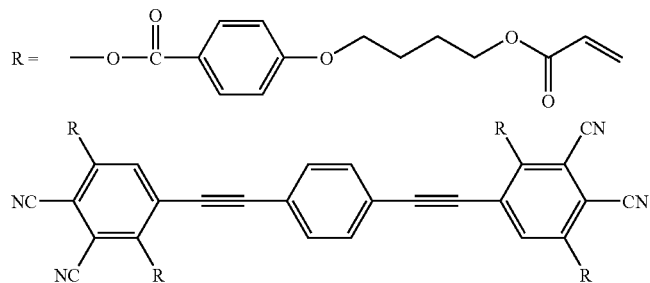
T-214
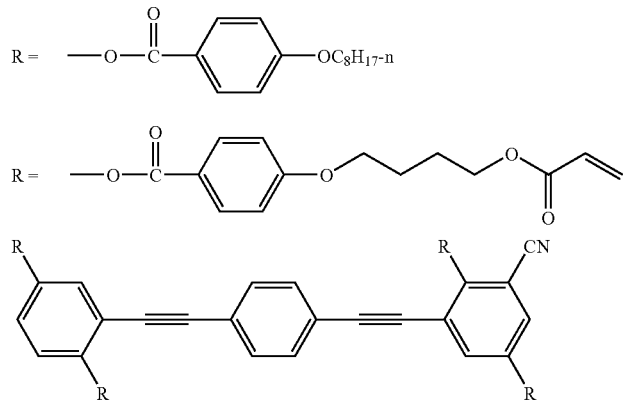
T-215
T-216
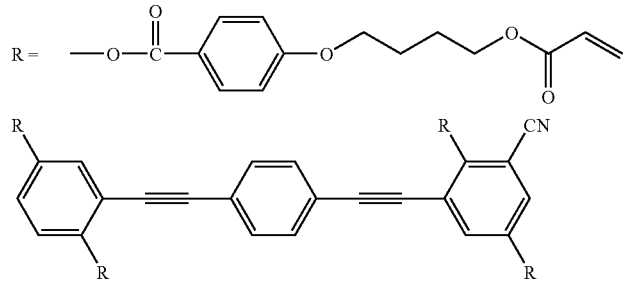
T-217
T-218
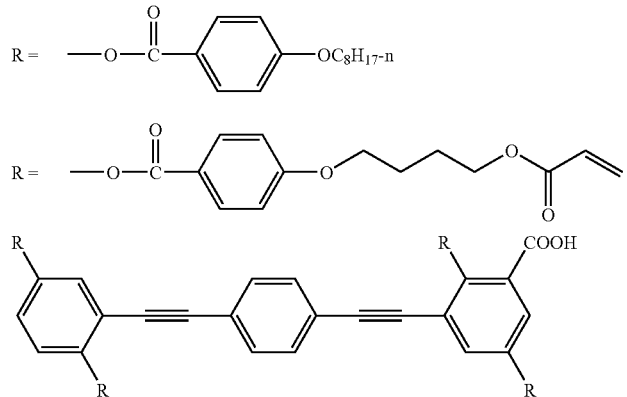
T-219
T-220
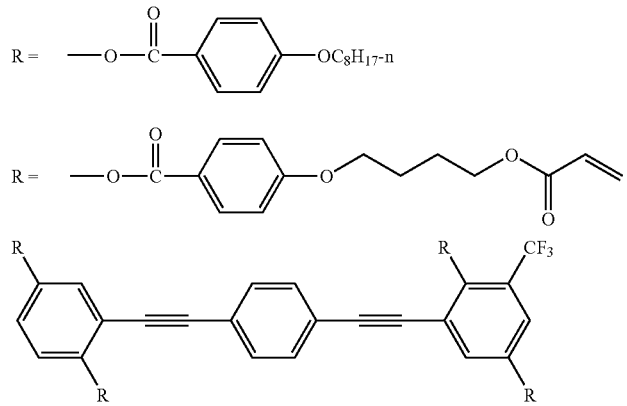
T-221
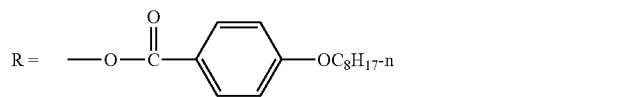

-continued

T-222

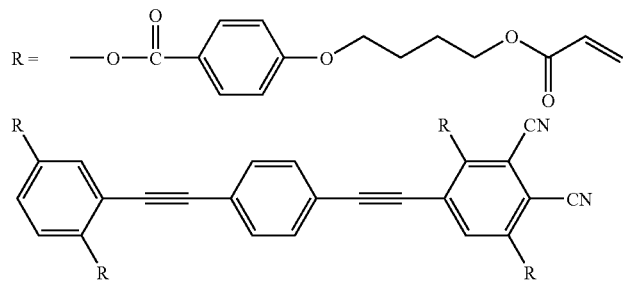

T-223

T-224

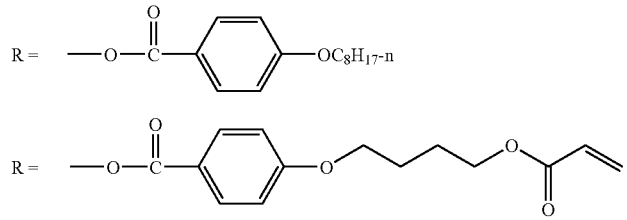

These compounds represented by formula (I) of the present invention can be synthesized by a method in accordance with or pursuant to Synthesis Examples described later.

The liquid crystalline composition and retardation film of the present invention are described below.

Liquid Crystalline Composition

The liquid crystalline composition of the present invention contains the compound represented by formula (I). In the case of using the liquid crystalline composition of the present invention for a retardation film, the composition preferably exhibits good monodomain property so as to obtain uniform and defectless orientation (or alignment) of the liquid crystalline compounds. If the monodomain property is bad, a polydomain structure results to cause alignment defects at the boundary between domains and in turn cause scattering of light. This disadvantageously gives rise to reduction in the transmittance of the retardation film. In order to exhibit good monodomain property, the liquid crystalline composition of the present invention preferably exhibits a nematic phase (N phase). The nematic phase also includes a uniaxial nematic phase and a biaxial nematic phase but in the present invention, a biaxial nematic phase is preferred. The biaxial nematic phase is a nematic phase of optically exhibiting biaxiality. In other words, refractive indexes nx, ny and nz in three axial directions of the nematic phase differ from each other and satisfy, for example, the relationship of nx>ny>nz.

Furthermore, in the case of use for a retardation film, from the aspect of suitability or the like for the production of a retardation film, the liquid crystalline composition of the present invention preferably has a liquid crystal temperature of 10 to 250° C., more preferably from 10 to 150° C. If the liquid crystal temperature is less than 10° C., a cooling step or the like is sometimes required for lowering the temperature to the temperature range where the liquid crystal phase is exhibited, whereas if it exceeds 200° C., a high temperature higher than the temperature range where a liquid crystal phase is once exhibited is necessary for providing an isotropic liquid state and this is disadvantageous in view of waste of heat energy, deformation or deterioration of substrate, or the like.

The amount of the compound represented by formula (I) is preferably from 10 to 99 mass %, more preferably from 30 to 99 mass %, still more preferably from 50 to 99 mass %, in the liquid crystalline composition.

Retardation Film

The retardation film of the present invention comprises a transparent support having thereon an alignment film and at least one optically anisotropic layer containing a compound represented by formula (I). The retardation film of the present invention can be obtained by once heating the liquid crystalline composition containing a compound of formula (I) to a liquid crystal phase forming temperature so as to fix it without impairing the alignment form in the liquid crystal state and then cooling the composition while maintaining the aligned (oriented) state to form an optically anisotropic layer. The retardation film can also be obtained by heating a liquid crystalline composition resulting from addition of a polymerization initiator to a liquid crystalline compound having a polymerizable group, to the liquid crystal phase forming temperature and then polymerizing and cooling the composition. The "fixed state" as used in the present invention is most typically and most preferably a state that the alignment of the liquid crystalline compound contained in the optically anisotropic layer is maintained, but the fixed state is not limited thereto and specifically indicates a state that the optically anisotropic layer does not exhibit flowability at a temperature range usually from 0° C. to 50° C., in severer conditions, from −30° C. to 70° C., and also the fixed alignment form can be stably maintained without causing any change in the alignment form due to external field or force.

In the retardation film of the present invention, when the optically anisotropic layer is finally formed, the liquid crystalline compound may lose the liquid crystallinity as long as the optical anisotropy is maintained. For example, it is possible that a low-molecular biaxial liquid crystal compound has a group of undergoing a reaction due to heat, light or the like and as a result of the reaction due to heat, light or the like, undergoes polymerization or crosslinking to have a high molecular weight and lose the liquid crystallinity.

The thickness of the optically anisotropic layer formed from the liquid crystalline composition is preferably from 0.1 to 20 μm, more preferably from 0.2 to 15 μm, and most preferably from 0.3 to 10 μm.

Additives of Optically Anisotropic Layer

In the present invention, the liquid crystalline composition for forming the optically anisotropic layer may contain arbitrary additives in addition to the liquid crystalline compound of the present invention. Examples of the additive include an air interface orientation controlling agent, an anti-shedding agent, a polymerization initiator and a polymerizable monomer.

Air Interface Orientation Controlling Agent

The liquid crystalline compound is known to differ in the tilt angle at the air interface depending on the kind of compound. The tilt angle at the air interface must be freely controlled according to the optical purpose of the retardation film. This tilt angle can be controlled by applying an external field such as electric field or magnetic field or by adding an additive, but is preferably controlled by adding an additive. The additive is preferably a compound containing, within the molecule, one or more, more preferably two or more, substituted or unsubstituted aliphatic group(s) having from 6 to 40 carbon atoms, or substituted or unsubstituted aliphatic substituted oligosiloxanoxy group(s) having from 6 to 40 carbon atoms.

The amount added of the additive for controlling the orientation of the liquid crystalline compound in the air interface side is preferably from 0.001 to 20 mass %, more preferably from 0.01 to 10 mass %, and most preferably from 0.1 to 5 mass %, based on the liquid crystalline composition.

Anti-Shedding Agent

In general, as the material used together with the liquid crystalline compound for preventing the shedding at the coating of the liquid crystalline composition, a polymer can be suitably used. The polymer used is not particularly limited insofar as it does not extremely change the tilt angle or inhibit the orientation of the liquid crystalline compound. Examples of the polymer include those described in JP-A-8-95030 and specific examples of particularly preferred polymers include cellulose esters. Examples of the cellulose ester include cellulose acetate, cellulose acetate propionate, hydroxypropylcellulose and cellulose acetate butyrate. In order not to inhibit the alignment of the liquid crystalline compound, the amount added of the polymer used for preventing the shedding is in general preferably from 0.1 to 10 mass %, more preferably from 0.1 to 8 mass %, still more preferably from 0.1 to 5 mass %, based on the liquid crystalline compound.

Polymerization Initiator

In the present invention, the liquid crystalline compound is preferably fixed in the monodomain alignment, namely, in the substantially uniformly oriented state. For this purpose, when a polymerizable liquid crystalline compound is used, for example, when $Q_1$, $Q_2$, $Q_3$, $Q_4$ or the like in formula (I) has a polymerizable group, the liquid crystalline compound is preferably fixed by polymerization reaction.

The polymerization reaction includes a thermal polymerization reaction using a thermal polymerization initiator, a photopolymerization reaction using a photopolymerization initiator, and a polymerization reaction by the irradiation of an electron beam, but a photopolymerization reaction and a polymerization reaction by the irradiation of an electron beam are preferred so as to prevent the support or the like from deformation or deterioration due to heat. Examples of the photo-polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970). The amount of the photopolymerization initiator used is preferably from 0.01 to 20 mass %, more preferably from 0.5 to 5 mass %, based on the solid content of the coating solution. The light irradiation for the polymerization of liquid crystalline compound is preferably performed by using an ultraviolet ray. The irradiation energy is preferably from 10 mJ/m$^2$ to 50 J/cm$^2$, more preferably from 50 to 800 mJ/cm$^2$. In order to accelerate the photopolymerization reaction, the light irradiation may be performed under heating. The oxygen concentration in the atmosphere contributes to the polymerization degree and therefore, when a predetermined polymerization degree is not achieved in air, the oxygen concentration is preferably decreased by nitrogen purging or the like. The oxygen concentration is preferably 10% or less, more preferably 7% or less, and most preferably 3% or less.

Polymerizable Monomer

In the liquid crystalline composition, a polymerizable monomer may be added. The polymerizable monomer used together with the liquid crystalline compound is not particularly limited insofar as it has compatibility with the liquid crystalline compound and does not extremely change the tilt angle or inhibit the orientation of the liquid crystalline compound. Among these polymerizable monomers, preferred are compounds having a polymerization-active ethylenically unsaturated group such as vinyl group, vinyloxy group, acryloyl group or methacryloyl group. The amount of the polymerizable monomer added is generally from 0.5 to 50 mass %, preferably from 1 to 30 mass %, based on the liquid crystalline compound. When a monomer having two or more reactive functional groups is used, an effect of enhancing the adhesion between the alignment film and the optically anisotropic layer may be provided and therefore, this is particularly preferred.

Coating Solvent

The solvent used for the preparation of the liquid crystalline composition is preferably an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Among these, alkyl halides, esters or ketones are preferred. Two or more organic solvents may be used in combination.

Coating Method

The optically anisotropic layer is formed by preparing a coating solution of the liquid crystalline composition with use of the above-described solvent and then coating the solution on an alignment film to align the liquid crystal compound. The coating solution can be coated by a known method (e.g., wire bar coating, extrusion coating, direct gravure coating, reverse gravure coating, die coating).

Alignment Film

The alignment film can be provided, for example, by the rubbing of an organic compound (preferably a polymer), the oblique vapor deposition of an inorganic compound, the formation of a layer having microgrooves, or the accumulation of an organic compound (e.g., ω-tricosanoic acid, methyl stearate) according to a Langmuir-Blodgett (LB film) method. Furthermore, an alignment film capable of exerting an aligning function upon application of an electric field, application of magnetic field or irradiation with light is also known. The alignment film may be any layer as long as the liquid crystalline compound of the optically anisotropic layer provided on the alignment film can be oriented in desired alignment, but in the present invention, the alignment film is preferably formed by rubbing treatment or irradiation with light. In particular, an alignment film formed by rubbing a polymer is preferred. The rubbing treatment can be generally performed by rubbing the polymer layer surface with paper or cloth several times in a constant direction, but in the present invention, this treatment is preferably performed by the method described in *Ekisho Binran* (*Handbook of Liquid Crystal*), Maruzen (2000). The thickness of the alignment film is preferably from 0.01 to 10 μm, more preferably from 0.05 to 3 μm.

The polymer for use in the alignment film is described in many publications and a large number of commercial products are available. For the alignment film used in the retardation film of the present invention, a polyvinyl alcohol or a derivative thereof is preferably used and a modified polyvinyl alcohol bonded with a hydrophobic group is more preferred. As for the alignment film, an alignment film used for discotic liquid crystal can be used as the alignment film for liquid crystal and such an alignment film is described in WO01/88574A1, page 43, line 24 to page 49, line 8.

Rubbing Density of Alignment Film

The rubbing density of the alignment film and the tilt angle of the liquid crystal compound at the interface with the alignment film have a relationship such that as the rubbing density is increased, the tilt angle becomes small, whereas as the rubbing density is decreased, the tilt angle becomes large. Therefore, the tilt angle can be adjusted by varying the rubbing density of the alignment film. The rubbing density of the alignment film can be varied by the method described in *Ekisho Binran* (*Handbook of Liquid Crystal*), Maruzen (2000). More specifically, the rubbing density (L) is quantified by formula (A):

$$L = Nl\{1+(2\pi rn/60v)\} \quad \text{Formula (A):}$$

wherein N is the number of rubbings, l is the contact length of the rubbing roller, r is the radius of the roller, n is the rotation number (rpm) of the roller and v is the stage moving speed (per second).

According to formula (A), the rubbing density may be elevated by increasing the number of rubbings, the contact length of the rubbing roller, the radius of the roller or the rotation number of the roller or by decreasing the stage moving speed. On the other hand, the rubbing density may be lowered by reversing the increase or decrease of these factors.

Transparent Support

With respect to the transparent support for use in the retardation film of the present invention, the material therefor is not particularly limited as long as it mainly exhibits optical isotropy and ensures a light transmittance of 80% or more, but a polymer film is preferred. Specific examples of the polymer include cellulose esters (e.g., cellulose diacetate, cellulose triacetate), norbornene-base polymers and poly(meth)acrylate esters. Many commercially available polymers can be suitably used. Among these, in view of the optical performance, cellulose esters are preferred and lower fatty acid esters of cellulose are more preferred. The lower fatty acid means a fatty acid having 6 or less carbon atoms and the number of carbon atoms is preferably 2 (cellulose acetate), 3 (cellulose propionate) or 4 (cellulose butyrate). Of these, cellulose triacetate is more preferred. A mixed fatty acid ester such as cellulose acetate propionate or cellulose acetate butyrate may also be used. Furthermore, even in the case of conventionally known polymers of readily expressing birefringence, such as polycarbonate or polysulfone, those reduced in the expression of birefringence by modifying the molecule, described in WO00/26705, can be used.

The cellulose ester (particularly cellulose) which is preferably used as the transparent support is described in detail below. The cellulose ester is preferably a cellulose acetate having an acetylation degree of 55.0 to 62.5%, more preferably from 57.0 to 62.0%. The acetylation degree means the amount of acetic acid bonded per unit mass of cellulose. The acetylation degree is determined according to the Measurement and Calculation of Acetylation Degree described in ASTM: D-817-91 (Test Method of Cellulose Acetate, etc.). The viscosity average polymerization degree (DP) of cellulose ester is preferably 250 or more, more preferably 290 or more. The cellulose ester for use in the present invention preferably has a narrow molecular weight distribution Mw/Mn (Mw is a mass average molecular weight and Mn is a number average molecular weight) as measured by gel permeation chromatography. Specifically, the Mw/Mn value is preferably from 1.0 to 4.0, more preferably from 1.3 to 3.5, and most preferably from 1.4 to 3.0.

In the cellulose triacetate, the hydroxyl groups at the 2-position, 3-position and 6-position of cellulose are not evenly distributed in ⅓ portions of the entire substitution degree, but the substitution degree of hydroxyl group at the 6-position is liable to become small. The substitution degree of hydroxyl group at the 6-position of cellulose is preferably larger than those at the 2-position and 3-position. The hydroxyl group at the 6-position, which is substituted by an acyl group, preferably accounts for 30 to 40%, more preferably 31% or more, still more preferably 32% or more, of the entire substitution degree. The substitution degree at the 6-position is preferably 0.88 or more. The hydroxyl group at the 6-position may be substituted by an acyl group having 3 or more carbon atoms (e.g., propionyl, butyryl, valeroyl, benzoyl, acryloyl) other than an acetyl group. The substitution degree at each position can be determined by NMR. Cellulose esters having a high substitution degree of hydroxyl group at the 6-position can be synthesized by referring to the methods described in JP-A-11-5851, that is, Synthesis Example 1 (paragraphs 0043 to 0044), Synthesis Example 2 (paragraphs 0048 to 0049) and Synthesis Example 3 (paragraphs 0051 to 0052).

In the polymer film used as the transparent support, particularly in the cellulose acetate film, an aromatic compound having at least two aromatic rings may be used as a retardation increasing agent so as to adjust the retardation. In the case of using such a retardation increasing agent, the retardation increasing agent is used in an amount of 0.01 to 20 parts by mass, preferably from 0.05 to 15 parts by mass, more preferably from 0.1 to 10 parts by mass, per 100 parts by mass of the cellulose acetate. Two or more aromatic compounds may be used in combination. The aromatic ring of the aromatic compound includes an aromatic hydrocarbon ring and an aromatic heterocyclic ring.

The aromatic hydrocarbon ring of the aromatic compound used as the retardation increasing agent is preferably a 6-membered ring (namely, benzene ring). The aromatic heterocyclic ring is generally an unsaturated heterocyclic ring. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring or a 1,3,5-triazine ring, more preferably a benzene ring or a 1,3,5-triazine ring.

The aromatic compound most preferably contains at least one 1,3,5-triazine ring. The number of aromatic rings in the aromatic compound is preferably from 2 to 20, more preferably from 2 to 12, still more preferably from 2 to 8, and most preferably from 2 to 6.

The bonding relationship of two aromatic rings in the aromatic compound used as the retardation increasing agent can be classified into (a) a case where two aromatic rings form a condensed ring, (b) a case where two aromatic rings are directly bonded by a single bond and (c) a case where two aromatic rings are bonded through a linking group (a spiro bond cannot be formed because the rings are an aromatic ring). The bonding relationship may be any one of (a) to (c). Such a retardation increasing agent is described in WO01/88574A1, WO00/2619A1, JP-A-2000-111914, JP-A-2000-275434 and Japanese Patent Application No. 2002-70009.

The cellulose acetate as the transparent support comprises a single layer or multiple layers. For example, in the case of cellulose triacetate, the single-layer cellulose triacetate can be prepared by drum casting, band casting or the like disclosed in JP-A-7-11055 and the latter multilayer cellulose triacetate can be prepared by a so-called co-casting method disclosed in JP-A-61-94725 and JP-B-62-43846 (the term "JP-B" as used herein means an "examined Japanese patent publication"). More specifically, raw material flakes are dissolved in a solvent such as halogenated hydrocarbons (e.g., dichloromethane), alcohols (e.g., methanol, ethanol, butanol), esters (e.g., methyl formate, methyl acetate) or ethers (e.g., dioxane, dioxolane, diethyl ether), and after adding various additives, if desired, such as plasticizer, ultraviolet absorbent, deterioration inhibitor, slipping agent and release accelerator, the resulting solution (called a dope) is cast on a support comprising a horizontal endless metal belt or a rotating drum by using a dope feed device (called a die). At the casting, in the case of a single-layer cellulose triacetate, a single dope is cast in a single layer and in the case of a multilayer cellulose triacetate, a low-concentration dope is co-cast in both sides of a high-concentration cellulose ester dope. After proper drying on the support, the film imparted with rigidity is released from the support and then passed through a drying zone by using a transportation device of various types to remove the solvent.

A representative example of the solvent for dissolving the cellulose triacetate is dichloromethane, but in view of global environment or working environment, the solvent preferably contains substantially no halogenated hydrocarbon such as dichloromethane. The term "contain substantially no halogenated hydrocarbon" as used herein means that the percentage of halogenated hydrocarbon in the organic solvent is less than 5 mass % (preferably less than 2 mass %). In the case of preparing a cellulose triacetate dope by using a solvent containing substantially no dichloromethane or the like, a special dissolution method described later must be used. This method is called a cooling dissolution method or a high-temperature dissolution method. The cellulose acetate film containing substantially no halogenated hydrocarbon such as dichloro-methane, and the production method thereof are described in detail in JIII Journal of Technical Disclosure No. 2001-1745 issued on Mar. 15, 2001 (hereinafter simply referred to as "Technical Disclosure No. 2001-1745").

As for additives added for improving various physical properties of cellulose acetate, those described in Technical Disclosure No. 2001-1745 can be preferably used.

In the case where the transparent support is cellulose acetate, this film is preferably subjected to a saponification treatment so as to attain satisfactory adhesion when bonded to another functional layer or substrate, for example, by providing an adhesive layer on one surface. The saponification treatment is performed by a known method, for example, by dipping the film in an alkali solution for an appropriate time period. After the dipping in an alkali solution, for not allowing the alkali component to remain in the film, the film is preferably thoroughly washed with water or dipped in a dilute acid to neutralize the alkali component. By performing the saponification treatment, the transparent support surface is hydrophilized. The hydrophilized surface is effective particularly in enhancing the adhesion to the polarizing film mainly comprising a polyvinyl alcohol. Furthermore, dusts in air less adhere to the hydrophilized surface and therefore, dusts scarcely enter between the polarizing film and the transparent support on bonding to the polarizing film, so that dot defects due to dusts can be effectively prevented.

The saponification treatment is preferably performed such that the transparent support surface has a contact angle to water of 400 or less, more preferably 30° or less, still more preferably 20° or less.

Specifically, the method for alkali saponification can be selected from the following two methods. The method (1) is superior in the point that the treatment can be performed by the same process as the treatment for general-purpose cellulose acetate films, but there may arise problems that the optically anisotropic layer surface is also saponified to cause film deterioration due to alkali hydrolysis of the surface and if the saponification solution remains, this gives rise to staining. In such a case, the method (2) is superior, though this is a special process.

(1) After an optically anisotropic layer is formed on the transparent support, the film is dipped at least once in an alkali solution to saponify the back surface of the film.

(2) Before or after formation of an optically anisotropic layer on the transparent support, an alkali solution is coated on the surface of transparent support opposite the surface where the optically anisotropic layer is formed, and then the film is heated, washed with water and/or neutralized to saponify only the back surface of the transparent support.

The surface energy of the cellulose acetate film is preferably 55 mN/m or more, more preferably from 60 to 75 mN/m. The surface energy of a solid can be determined by a contact angle method, a wetting heat method or an adsorption method as described in *Nure no Kiso to Oyo* (*Elemental and Application of Wetting*), Realize (Dec. 10, 1989). In the case of the cellulose acetate film of the present invention, a contact angle method is preferred. More specifically, two kinds of solutions of which surface energies are known are dropped on the cellulose acetate film and by defining that out of angles made by the tangent of liquid droplet and the film surface at the intersection of the liquid droplet surface and the film surface, the angle including the liquid droplet is the contact angle, the surface energy of the film can be calculated by computation.

The thickness of the cellulose triacetate film is usually from 5 to 500 μm, preferably from 20 to 250 μm, more preferably from 30 to 180 μm, still more preferably from 30 to 110 μm.

The retardation film of the present invention can be used for an elliptically polarizing film by combining it with a polarizing film. Furthermore, when applied in combination with a polarizing film to a transmission liquid crystal display device, the retardation film contributes to the enlargement of view angle. The elliptically polarizing film and liquid crystal display device using the retardation film of the present invention are described below.

Elliptically Polarizing Film

An elliptically polarizing film can be produced by stacking the retardation film of the present invention and a polarizing film. By the use of the retardation film of the present invention, an elliptically polarizing film capable of enlarging the view angle of a liquid crystal display device can be provided.

The polarizing film includes an iodine-type polarizing film, a dye-type polarizing film using a dichroic dye, and a polyene-type polarizing film. The iodine-type polarizing film or dye-type polarizing film is generally produced by using a polyvinyl alcohol-base film. The polarization axis of polarizing film corresponds to the direction perpendicular to the stretching direction of the film.

The polarizing film is stacked on the optically anisotropic layer side of the retardation film of the present invention. On the surface of the polarizing film opposite the side where the optically anisotropic layer is stacked, a transparent protective film is preferably formed. The transparent protective film preferably has a light transmittance of 80% or more. For the transparent protective film, a cellulose ester film is generally used and a cellulose triacetate film is preferred. The cellulose ester film is preferably formed by a solvent casting method. The thickness of the transparent protective film is preferably from 20 to 500 μm more preferably from 50 to 200 μm.

Liquid Crystal Display Device

By the use of the retardation film of the present invention, a liquid crystal display device enlarged in the view angle can be provided. The retardation film (optical compensatory sheet) for TN-mode liquid crystal cells is described in JP-A-6-214116, U.S. Pat. Nos. 5,583,679 and 5,646,703 and German Patent Publication No. 3911620A1. The retardation film (optical compensatory sheet) for IPS-mode or FLC-mode liquid crystal cells is described in JP-A-10-54982, the retardation film (optical compensatory sheet) for OCB-mode or HAN-mode liquid crystal cells is described in U.S. Pat. No. 5,805,253 and International Patent Publication WO96/37804, the retardation film (optical compensatory sheet) for STN-mode liquid crystal cells is described in JP-A-9-26572, and the retardation film (optical compensatory sheet) for VA-mode liquid crystal cells is described in Japanese Patent 2,866,372.

In the present invention, the retardation film (optical compensatory sheet) for liquid crystal cells in various modes can be produced by referring to these patent publications. The retardation film of the present invention can be used for liquid crystal display devices in various display modes such as TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode.

The liquid crystal display device comprises a liquid crystal cell, a polarizing element and a retardation film (optical compensatory sheet). The polarizing element generally comprises a polarizing film and a protective film. As for the polarizing film and the protective film, those described above regarding the elliptically polarizing film can be used.

The present invention is described below by referring to Examples, however, the present invention is not limited to these Examples.

EXAMPLE 1

Synthesis Example of Liquid Crystalline Compound

SYNTHESIS EXAMPLE 1

Synthesis of T-9:

This compound can be synthesized according to the following scheme.

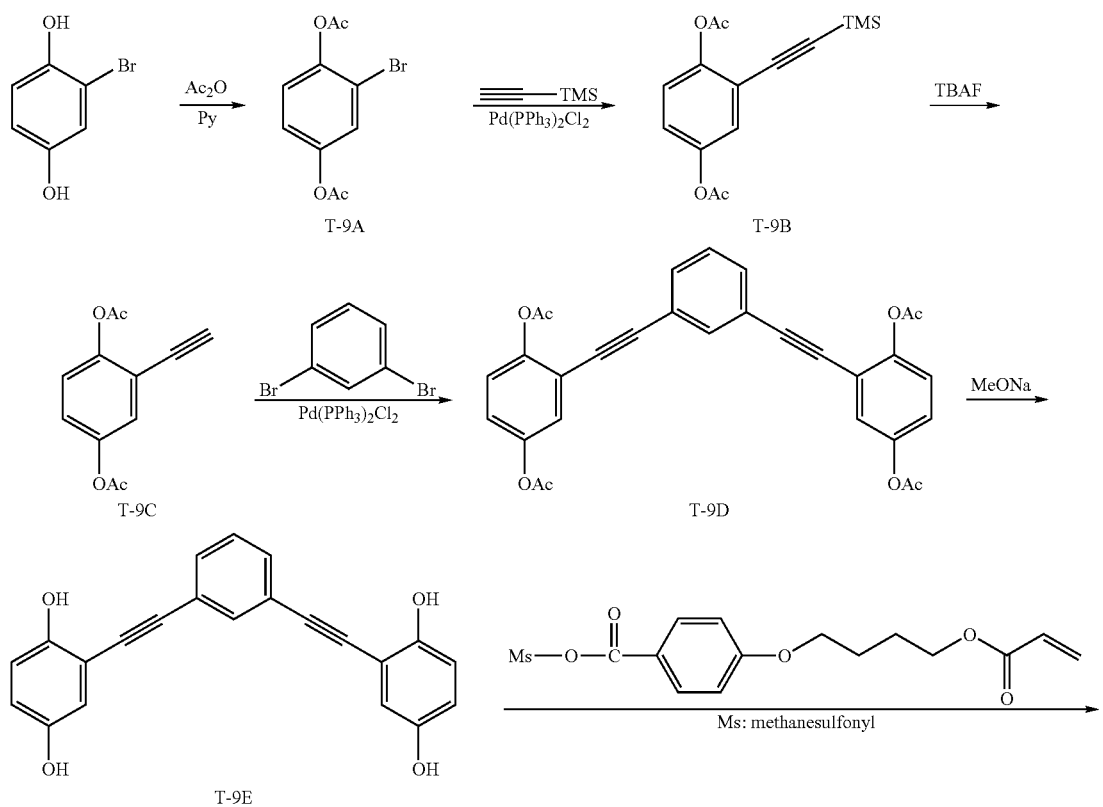

-continued

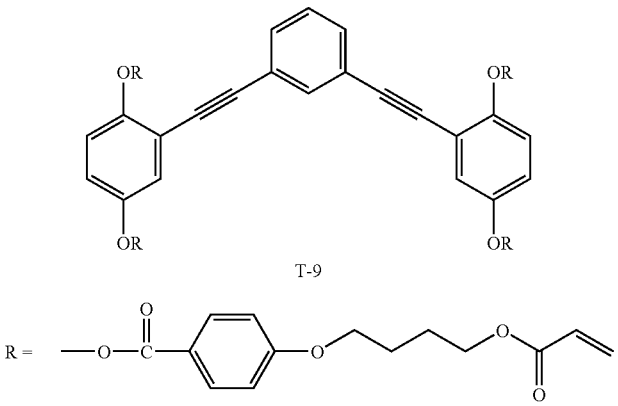

T-9

R = —O—C(=O)—C6H4—O—(CH2)4—O—C(=O)—CH=CH2

(Synthesis of T-9A)

Bromohydroquinone (25.0 g) was dissolved in 70 ml of pyridine (Py) and at a reaction temperature of 50° C. or less, 37 ml of acetic anhydride ($Ac_2O$) was added dropwise. The resulting solution was stirred for 3 hours and after adding water, the reaction solution was extracted with ethyl acetate. The obtained organic layer was washed with saturated aqueous sodium bicarbonate, dilute hydrochloric acid, water and saturated brine and thereafter, the solvent was removed by distillation under reduced pressure. The residue was crystallized with hexane to obtain 32.2 g of the crystal of T-9A.

(Synthesis of T-9B)

T-9A (32.2 g), 17.4 g of trimethylsilyl (TMS) acetylene, 0.5 g of triphenylphosphine, 0.25 g of bis(triphenylphosphine)palladium(II) dichloride and 80 mg of copper(I) iodide were dissolved in 200 ml of triethylamine and the resulting solution was refluxed for 10 hours in a nitrogen atmosphere. After cooling, the precipitated triethylamine hydrochloride was separated by filtration and the organic layer was removed by distillation under reduced pressure. The obtained residue was purified by column chromatography to obtain 32.0 g of the crystal of T-9B.

(Synthesis of T-9C)

T-9B (32.0 g) was dissolved in 200 ml of tetrahydrofuran and thereto, 120 ml of a tetrahydrofuran solution (1.0 M solution) of tetrabutylammonium fluoride (TBAF) was added. The resulting solution was stirred at room temperature for 30 minutes and after adding water, the reaction solution was extracted with ethyl acetate and then washed with saturated brine. The organic layer was concentrated under reduced pressure and then purified by column chromatography to obtain 20.5 g of the crystal of T-9C.

(Synthesis of T-9D)

T-9C (3.0 g), 1.38 g of 1,3-dibromobenzene, 58 mg of triphenylphosphine, 29 mg of bis(triphenylphosphine)-palladium(II) dichloride and 10 mg of copper(I) iodide were dissolved in 23 ml of triethylamine and the resulting solution was refluxed for 10 hours in a nitrogen atmosphere. After cooling, 100 ml of methanol was added and the precipitated crystal was collected by filtration and purified by column chromatography to obtain 2.1 g of the crystal of T-9D.

(Synthesis of T-9E)

T-9D (0.6 g) was dissolved in 30 ml of methanol and thereto, 2 ml of sodium methoxide (28% methanol solution) was added under nitrogen bubbling. The resulting solution was stirred at room temperature for 1 hour and after adding dilute hydrochloric acid, the reaction solution was extracted with ethyl acetate. The obtained organic layer was removed by distillation under reduced pressure to obtain 0.4 g of the crystal of T-9E.

(Synthesis of T-9)

Methanesulfonyl chloride (1.34 g) was dissolved in 10 ml of tetrahydrofuran and the resulting solution was cooled to 0° C. Thereto, a tetrahydrofuran 20 ml solution containing 3.09 g of 4-(4-acryloyloxybutyloxy)benzoic acid and 1.55 g of diisopropylethylamine was added dropwise. After stirring at 0° C. for 1 hour, 1.55 g of diiopropyl-ethylamine and 0.1 g of 4-dimethylaminopyridine were added and then a tetrahydrofuran 10 ml solution containing 0.4 g of T-9E was added. The resulting solution was stirred at room temperature for 12 hours and after adding water, the reaction solution was extracted with ethyl acetate, concentrated under reduced pressure and then purified by column chromatography to obtain 1.23 g of the crystal of T-9. The NMR spectrum of T-9 obtained is shown below.

$^1$H-NMR (solvent: $CDCl_3$, standard: tetramethylsilane) δ (ppm): 1.70–1.90 (8H, m) 1.90–2.00 (8H, m) 3.99 (4H, brt) 4.11 (4H, t) 4.20 (4H, brt) 4.27 (4H, t) 5.82 (4H, dd) 6.12 (4H, ddd) 6.40 (4H, dd) 6.90–7.00 (8H, m) 7.05–7.15 (4H, m) 7.27 (2H) 7.43 (2H, d) 7.46 (2H, d) 8.10–8.20 (8H, m)

The phase transition temperature of the obtained T-9 was examined by observing the texture through a polarizing microscope. The phase was changed from crystal phase to N phase (nematic liquid crystal phase) in the vicinity of 65° C. on the way of elevating the temperature and changed to isotropic liquid phase when the temperature was exceeding 124° C. That is, T-9 exhibits the liquid crystal phase between 65° C. and 124° C.

EXAMPLE 2
SYNTHESIS EXAMPLE 2
Synthesis of T-173:
This compound can be synthesized according to the following scheme.
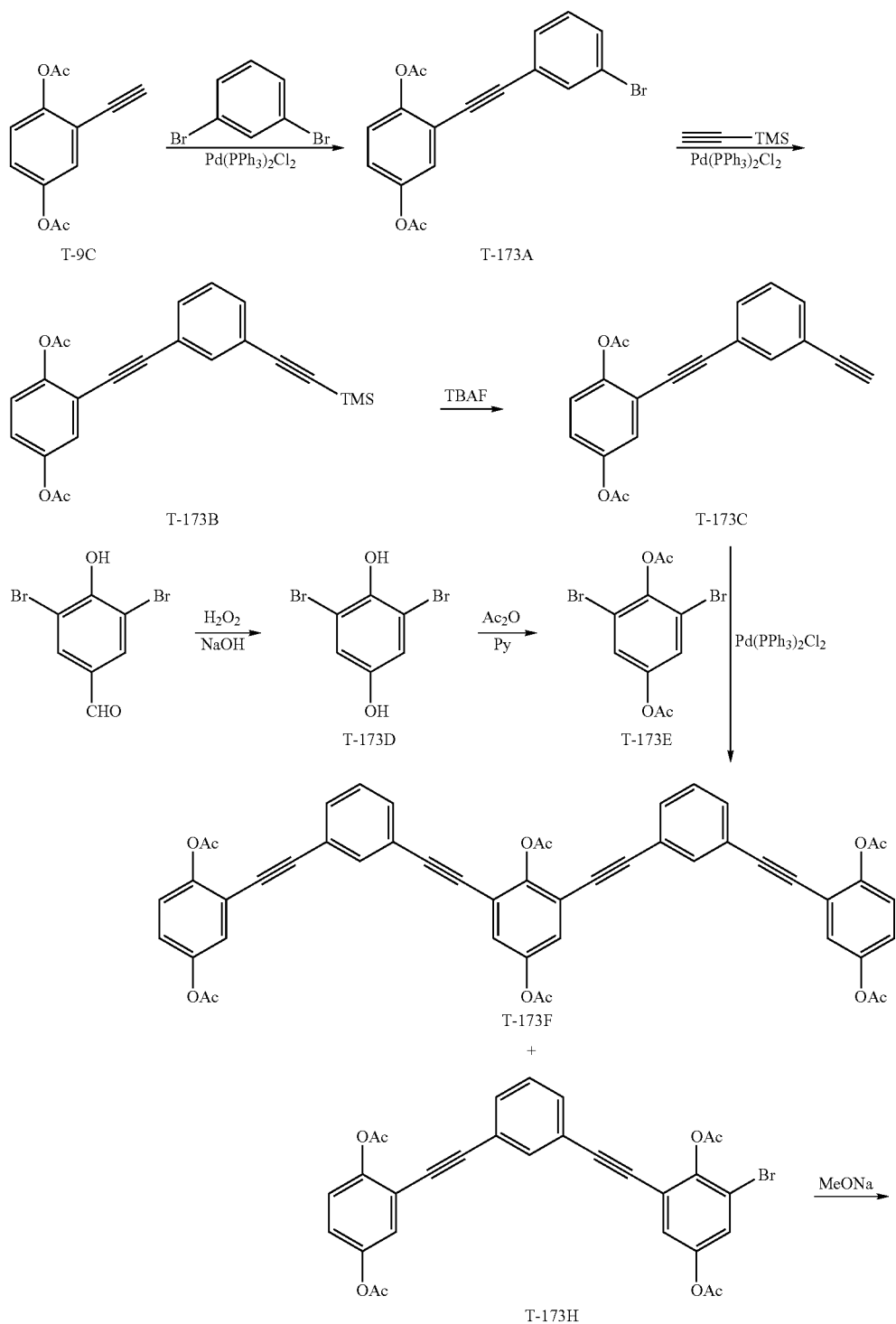

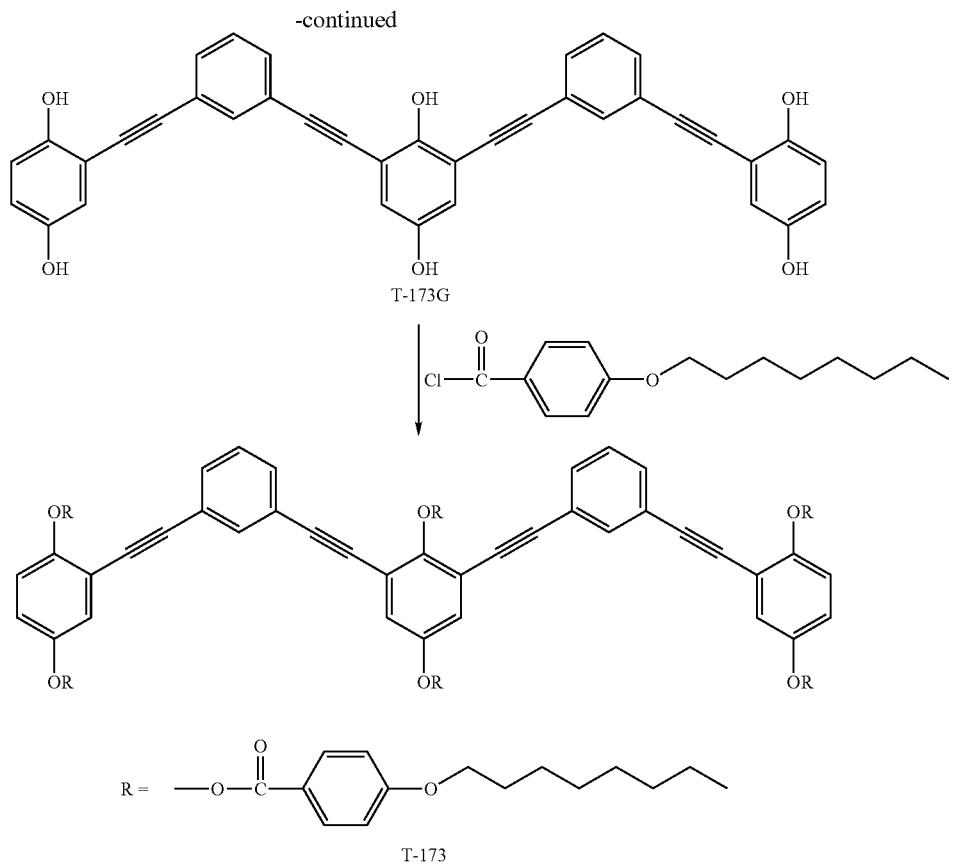

T-173G

R = —O—C(=O)—C₆H₄—O—C₈H₁₇

T-173

(Synthesis of T-173A)

T-9C (3.0 g) obtained according to Example 1, 10 g of 1,3-dibromobenzene, 58 mg of triphenylphosphine, 29 mg of bis(triphenylphosphine)palladium(II) dichloride and 10 mg of copper(I) iodide were dissolved in 50 ml of triethylamine and the resulting solution was refluxed for 10 hours in a nitrogen atmosphere. After cooling, water was added and the reaction solution was extracted with ethyl acetate and then washed with saturated brine. The organic layer was concentrated under reduced pressure and then purified by column chromatography to obtain 2.8 g of T-173A.

(Synthesis of T-173B)

T-173A (2.1 g), 0.83 g of trimethylsilyl acetylene, 24 mg of triphenylphosphine, 12 mg of bis(triphenyl-phosphine) palladium(II) dichloride and 4 mg of copper(I) iodide were dissolved in 20 ml of triethylamine and the resulting solution was refluxed for 10 hours in a nitrogen atmosphere. After cooling, water was added and the reaction solution was extracted with ethyl acetate and washed with saturated brine. The organic layer was concentrated under reduced pressure and then purified by column chromatography to obtain 1.5 g of T-173B.

(Synthesis of T-173C)

T-173B (1.5 g) was dissolved in 200 ml of tetrahydrofuran and thereto, 5 ml of a tetrahydrofuran solution (1.0M solution) of tetrabutylammonium fluoride was added. The resulting solution was stirred at room temperature for 30 minutes and after adding water, the reaction solution was extracted with ethyl acetate and washed with saturated brine. The organic layer was concentrated under reduced pressure and then purified by column chromatography to obtain 0.9 g of T-173C.

(Synthesis of T-173D)

Water (200 ml) and 54.3 ml of an aqueous 1M sodium hydroxide solution were added to 15.2 g of 3,5-dibromo-4-hydroxybenzaldehyde and the resulting solution was heated to 50° C. Thereto, a solution obtained by diluting 6.2 ml (31%) of aqueous hydrogen peroxide with 20 ml of water was added dropwise and the reaction was allowed to proceed at 50° C. for 5 hours. To the reaction solution, hydrochloric acid was added and then the precipitated crystal was collected by filtration. The obtained crystal was dried and thereto, 100 ml of toluene, 7.0 g of octyl cyanoacetate, 1 ml of acetic acid and 0.5 g of ammonium chloride were added. The resulting mixture was refluxed for 3 hours while removing water. After adding water, the reaction solution was extracted with ethyl acetate and washed with saturated brine. The organic layer was concentrated under reduced pressure and the obtained crystal was washed under heat for 30 minutes by adding hexane. The resulting crystal solution in the heated state was filtered to obtain 7.4 g of the crystal of T-173D.

(Synthesis of T-173E)

T-173D (7.35 g) was dissolved in 20 ml of pyridine and thereto, 7.8 ml of acetic anhydride was added dropwise at a reaction temperature of 50° C. or less. The resulting solution was stirred at 50° C. for 3 hours and after adding water, the reaction solution was extracted with ethyl acetate. The obtained organic layer was washed with saturated aqueous sodium bicarbonate, dilute hydrochloric acid, water and saturated brine and thereafter, the solvent was removed by distillation under reduced pressure. The residue was crystallized with hexane to obtain 9.3 g of the crystal of T-173E.

(Synthesis of T-173F)

T-173C (0.7 g), 0.37 g of T-173E, 10 mg of triphenylphosphine, 5 mg of bis(triphenylphosphine)-palladium(II) dichloride and 2 mg of copper(I) iodide were dissolved in 20 ml of triethylamine and the resulting solution was refluxed for 10 hours in a nitrogen atmosphere. After cooling, water was added and the reaction solution was extracted with ethyl acetate and washed with saturated brine. The organic layer was concentrated under reduced pressure and purified by column chromatography to obtain 0.18 g of T-173F and 0.21 g of T-173H (used for the synthesis of T-92 below).

(Synthesis of T-173G)

T-174F (0.18 g) was dissolved in a mixed solution containing 20 ml of tetrahydrofuran and 5 ml of methanol and thereto, 0.4 ml of sodium methoxide (28% methanol solution) was added under nitrogen bubbling. The resulting solution was stirred at room temperature for 1 hour and after adding dilute hydrochloric acid, the reaction solution was extracted with ethyl acetate. The obtained organic layer was removed by distillation under reduced pressure to obtain 0.12 g of the crystal of T-173G.

(Synthesis of T-173)

T-173G (0.06 g) and 0.4 g of 4-octyloxybenzoic acid chloride were dissolved in 10 ml of tetrahydrofuran and thereto, 0.2 g of diisopropylethylamine and 0.01 g of 4-dimethylaminopyridine were added. The resulting solution was stirred at room temperature for 12 hours and after adding water, the reaction solution was extracted with ethyl acetate, concentrated under reduced pressure and purified by column chromatography to obtain 0.2 g of the crystal of T-173. The NMR spectrum of T-173 obtained is shown below.

$^1$H-NMR (solvent: CDCl$_3$, standard: tetramethylsilane) δ (ppm): 0.85–0.95 (18H, m) 1.20–1.60 (60H, m) 1.70–1.90 (12H, m) 3.95–4.10 (12H, m) 6.90–7.00 (12H, m) 7.00–7.50 (16H, m) 8.10–8.25 (12H, m)

The phase transition temperature of the obtained T-173 was examined by observing the texture through a polarizing microscope. First, when the temperature was elevated, the phase was changed from crystal phase to isotropic liquid phase in the vicinity of 140° C. Then, the temperature was gradually lowered from 150° C., as a result, the phase was changed to N phase in the vicinity of 120° C. and when the temperature was lowered to room temperature, changed again to crystal phase. T-173 presented the liquid crystal phase between 120° C. and room temperature at the dropping of temperature and the texture thereof was agreeing with that described in a publication (*Mol. Cryst. Liq. Cryst.*, 288, 7 (1996)). Therefore, this compound was judged to be a biaxial liquid crystal.

EXAMPLE 3

SYNTHESIS EXAMPLE 3

Synthesis of T-174:

This compound can be synthesized according to the following scheme.

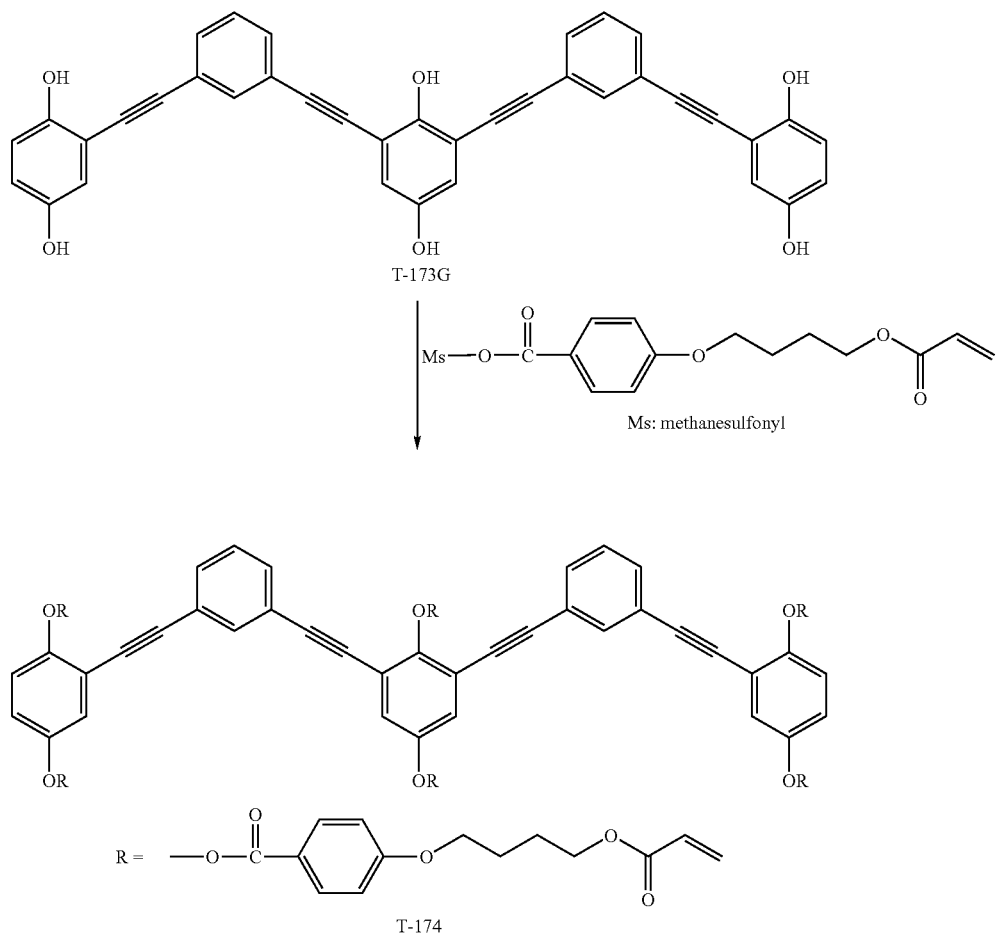

T-174

Using T-173G obtained according to Example 2 and 4-(4-acryloyloxybutyloxy)benzoic acid, T-174 was synthesized by the method described in Example 1. The NMR spectrum of T-174 obtained is shown below.

$^1$H-NMR (solvent: CDCl$_3$, standard: tetramethylsilane) δ (ppm): 1.70–1.90 (12H, m) 1.90–2.00 (12H, m) 3.95–4.30 (24H, m) 5.75–5.80 (6H, m) 6.05–6.20 (6H, m) 6.35–6.50 (6H, m) 6.90–7.00 (12H, m) 7.00–7.50 (16H, m) 8.10–8.25 (12H, m)

The phase transition temperature of the obtained T-174 was examined by observing the texture through a polarizing microscope. First, when the temperature was elevated, the phase was changed from crystal phase to isotropic liquid phase in the vicinity of 80° C. Then, the temperature was gradually lowered from 90° C., as a result, the phase was changed to N phase in the vicinity of 60° C. and when the temperature was lowered to room temperature, the phase was changed again to crystal phase. That is, T-174 presented the liquid crystal phase between 60° C. and room temperature at the dropping of temperature and from the texture thereof, this compound was judged to be a biaxial liquid crystal.

EXAMPLE 4

SYNTHESIS EXAMPLE 4

Synthesis of T-190:
This compound can be synthesized according to the following scheme.

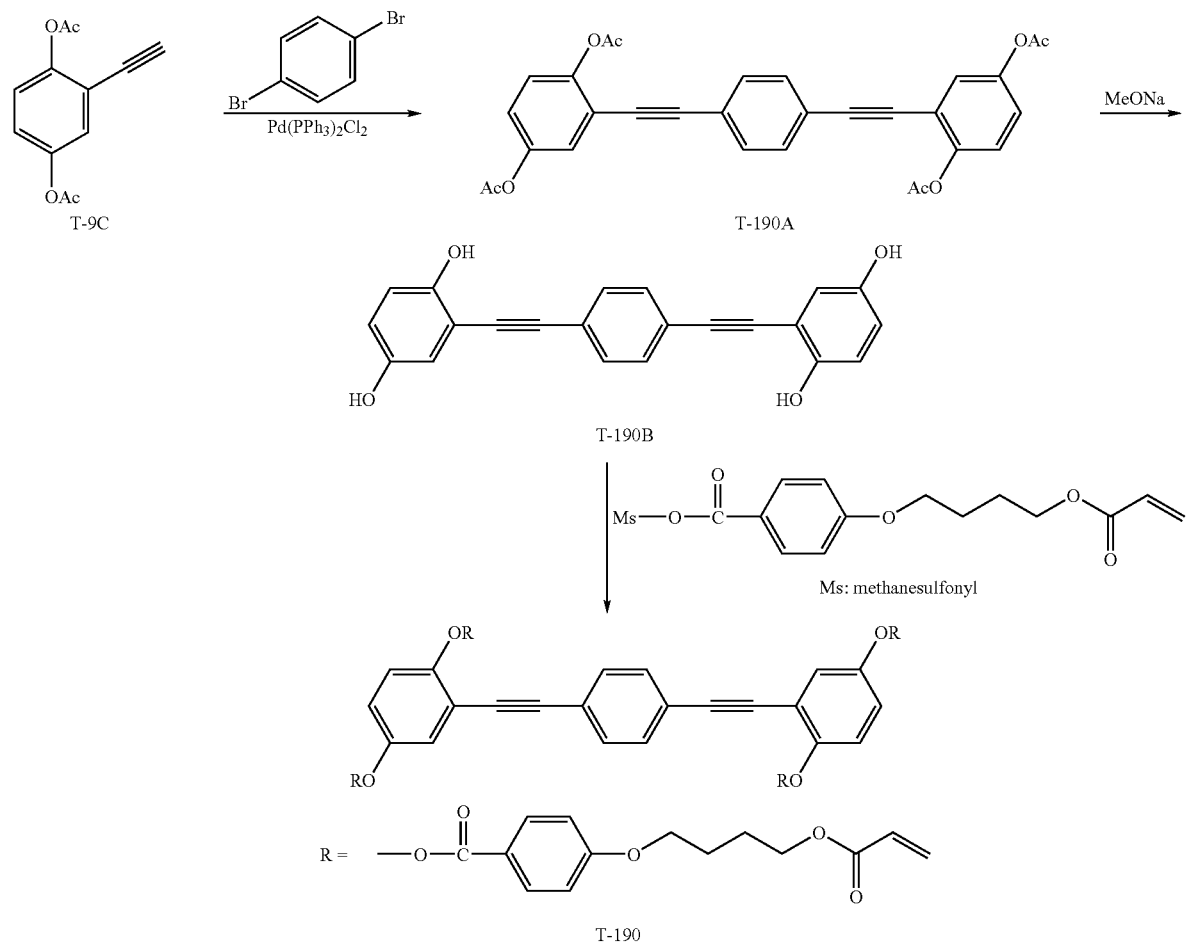

Using T-9C obtained according to Example 1 and 1,4-dibromobenzene, T-190 was synthesized through the same process as in the method of Example 1. The NMR spectrum of T-190 obtained is shown below.

$^1$H-NMR (solvent: CDCl$_3$, standard: tetramethylsilane) δ (ppm): 1.85–2.00 (16H, m) 4.11 (8H, brt) 4.28 (8H, brt) 5.82 (4H, dd) 6.12 (4H, ddd) 6.40 (4H, dd) 6.97 (4H, d) 6.97 (4H, d) 7.07 (4H, s) 7.25 (2H) 7.33 (2H, d) 7.46 (2H, d) 8.14 (4H, d) 8.20 (4H, d)

The phase transition temperature of the obtained T-190 was examined by observing the texture through a polarizing microscope. The phase was changed from crystal phase to N phase in the vicinity of 155° C. on the way of elevating the temperature and changed to isotropic liquid phase when the temperature was exceeding 158° C. That is, T-190 exhibits the liquid crystal phase between 155° C. and 158° C.

EXAMPLE 5

SYNTHESIS EXAMPLE 5

Synthesis of T-194:

This compound can be synthesized according to the following scheme.

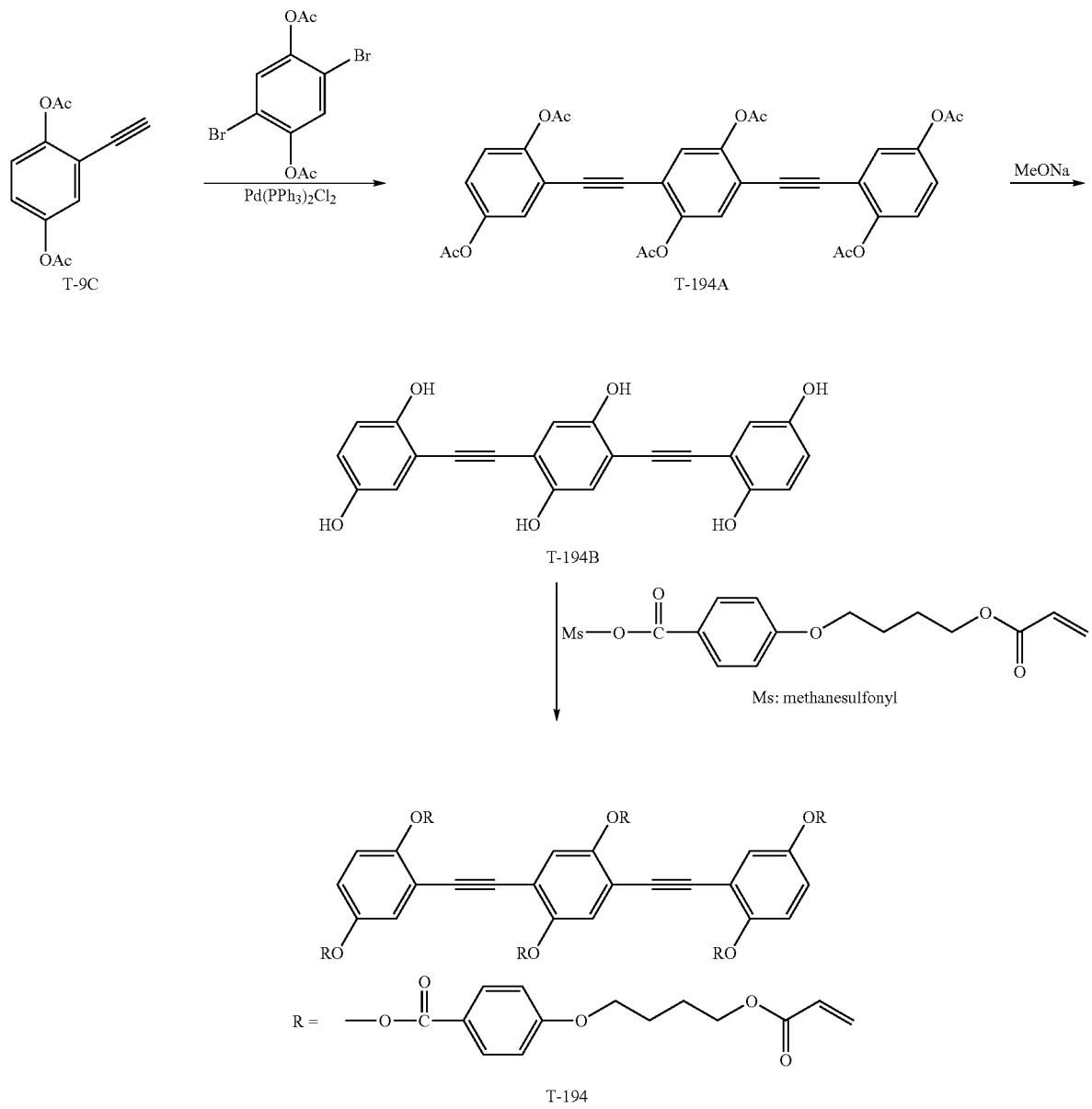

Using diacetyl-2,5-dibromohydroquinone synthesized from hydroquinone and T-9C obtained according to Example 1, T-194 was synthesized through the same process as in the method of Example 1. The NMR spectrum of T-194 obtained is shown below.

$^1$H-NMR (solvent: CDCl$_3$, standard: tetramethylsilane) δ (ppm): 1.70–1.90 (16H, m) 1.90–2.00 (8H, m) 3.90–4.00 (8H, m) 4.11 (4H, brt) 4.15–4.25 (8H, m) 4.27 (4H, t) 5.80–5.90 (6H, m) 6.10–6.20 (6H, m) 6.35–6.50 (6H, m) 6.90–7.00 (12H, m) 7.00–7.10 (4H, m) 7.18 (2H, d) 7.32 (2H, d) 8.10–8.20 (12H, m)

The phase transition temperature of the obtained T-194 was examined by observing the texture through a polarizing microscope. The phase was changed from crystal phase to N phase in the vicinity of 250° C. on the way of elevating the temperature and changed to isotropic liquid phase when the temperature was exceeding 260° C. That is, T-190 exhibits the liquid crystal phase between 250° C. and 260° C.

EXAMPLE 6

SYNTHESIS EXAMPLE 6

Synthesis of T-77:

This compound can be synthesized according to the following scheme.

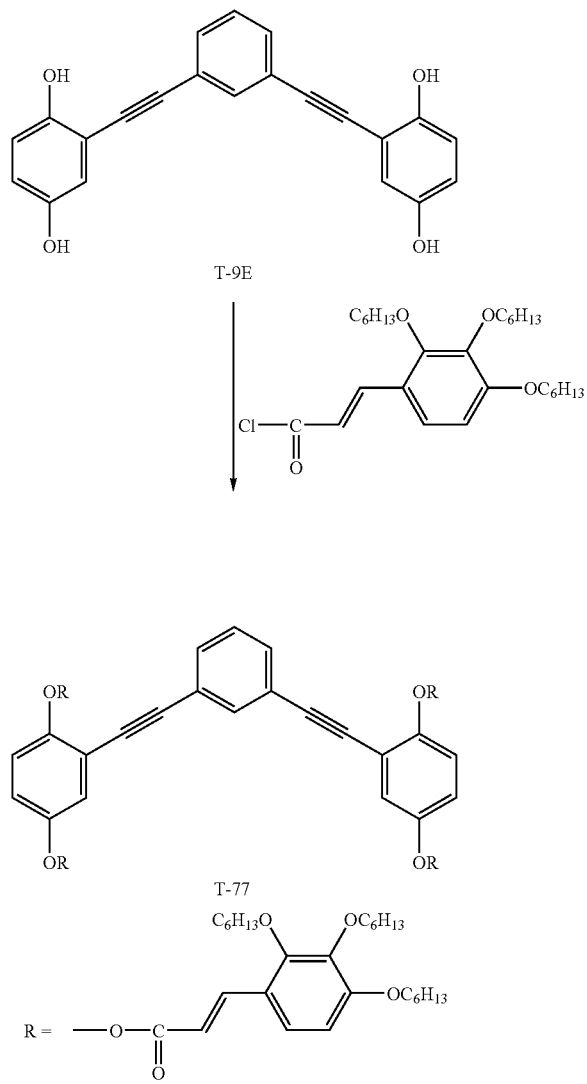

Using T-9E obtained according to Example 1 and 2,3,4-trihexyloxycinnamic acid chloride which can be synthesized in a usual manner from 2,3,4-trihexyloxycinnamic acid (reported by K. Praefcke et al. in *Mol. Cryst. Liq. Cryst. Lett.*, Vol. 7, page 27 (1990)), T-77 was synthesized almost in the same manner as in the method of Example 2. The NMR spectrum of T-77 obtained is shown below.

$^1$H-NMR (solvent: CDCl$_3$, standard: tetramethylsilane) δ (ppm): 0.8–1.00 (36H, m) 1.20–1.60 (72H, m) 1.60–1.90 (24H, m) 3.80–4.20 (24H, m) 6.50–6.75 (8H, m) 7.05–7.40 (13H, m) 7.55 (1H, s) 8.15 (2H, d) 8.22 (2H, d)

The phase transition temperature of the obtained T-77 was examined by observing the texture through a polarizing microscope. First, when the temperature was elevated, the phase was changed from crystal phase to isotropic liquid phase in the vicinity of 66° C. Then, the temperature was gradually lowered from 76° C., as a result, the phase was changed to N phase in the vicinity of 50° C. and when the temperature was lowered to room temperature, the phase was changed again to crystal phase. Thus, T-77 presented the liquid crystal phase between 50° C. and room temperature at the dropping of temperature and from the texture thereof, this compound was judged to be a biaxial liquid crystal.

EXAMPLE 7

SYNTHESIS EXAMPLE 7

Synthesis of T-92:

This compound can be synthesized according to the following scheme.

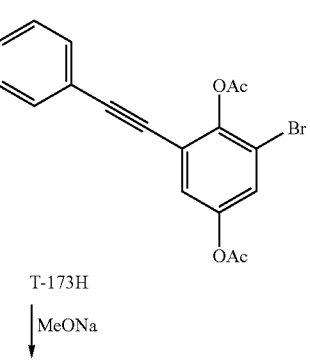

-continued

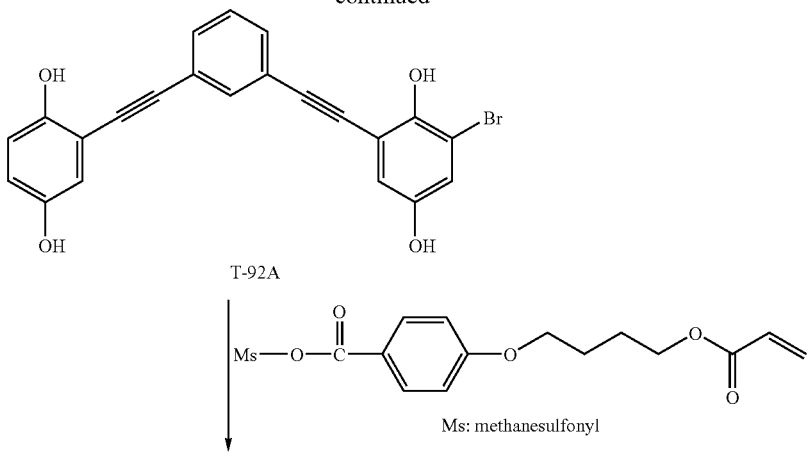

T-92A

Ms: methanesulfonyl

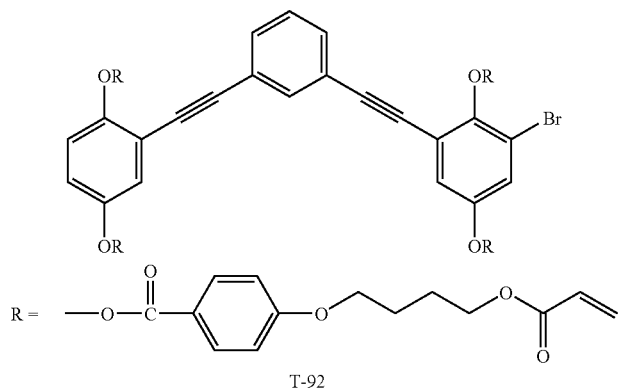

T-92

Using T-173H obtained according to Example 2, T-92 was synthesized by the method described in Example 1. The NMR spectrum of T-92 obtained is shown below.

$^1$H-NMR (solvent: CDCl$_3$, standard: tetramethylsilane) δ (ppm): 1.70–1.90 (8H, m) 1.80–2.00 (8H, m) 3.90–4.30 (16H, m) 5.80 (4H, dd) 6.12 (4H, ddd) 6.40 (4H, dd) 6.90–7.00 (8H, m) 7.00–7.15 (4H, m) 7.25–7.40 (2H) 7.40–7.50 (2H, m) 7.55 (1H, d) 8.10–8.20 (8H, m)

The phase transition temperature of the obtained T-92 was examined by observing the texture through a polarizing microscope. The phase was changed from crystal phase to N phase in the vicinity of 89° C. on the way of elevating the temperature and changed to isotropic liquid phase when the temperature was exceeding 94° C. That is, T-92 exhibits the liquid crystal phase between 89° C. and 94° C.

EXAMPLE 8

Production of Retardation Film (Formation of Alignment Film)

A modified polyvinyl alcohol shown below and glutaraldehyde (5 mass % of the modified polyvinyl alcohol) are dissolved in a methanol/water mixed solvent (volume ratio=20/80) to prepare a 5 mass % solution.

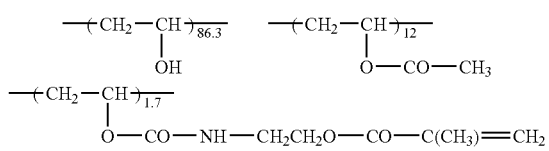

The solution prepared above is coated on a cellulose triacetate film (TD80U, produced by Fuji Photo Film Co., Ltd.) having a thickness of 100 μm and a size of 270 mm×100 mm, dried with hot air of 100° C. for 120 seconds and then rubbed to form an alignment film. The thickness of the obtained alignment film is 0.5 μm.

(Formation of Optically Anisotropic Layer)

On the alignment film obtained by rubbing, a coating solution for optically anisotropic layer having the following composition is coated using a #4 wire bar.

(Coating Solution for Optically Anisotropic Layer)
  Liquid Crystalline Compound T-173 100 parts by mass
  Air Interface Orientation Controlling Agent V-(1) 0.2 parts by mass
  Photopolymerization Initiator HJ-1 2.0 parts by mass
  Lucirin TPO-L (produced by BASF) 2.0 parts by mass
  Methyl ethyl ketone 300 parts by mass Air Interface Orientation Controlling Agent V-(1):

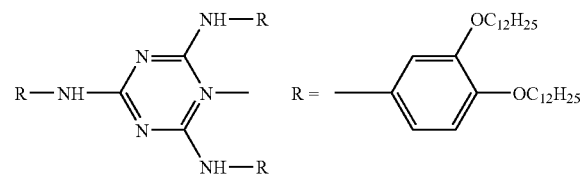

Photopolymerization Initiator HJ-1:

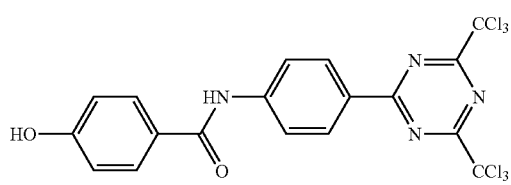

The film having coated thereon the optically anisotropic layer is placed in a thermostatic chamber at 80° C., heated to 60° C., held in that state for 5 minutes and then placed in a thermostatic chamber at 40° C. having an oxygen concentration of 2%. After 30 seconds, an ultraviolet ray of 600 mJ is irradiated to fix the alignment state of the optically anisotropic layer and then the film is allowed to cool to room temperature to produce a retardation film. The thickness of the optically anisotropic layer is 1.55 µM. The retardation in the direction perpendicular to the face of the obtained retardation film is 150 nm and the slow axis is parallel to the rubbing direction.

The biaxiality and tilt angle in the optically anisotropic layer of the obtained retardation film are judged by using a polarizing microscope with a free plate. As a result, it is confirmed that biaxiality is exhibited and the direction having a minimum refractive index is almost agreeing with the normal direction of the transparent support.

EXAMPLE 9

Production of Retardation Film
(Formation of Optically Anisotropic Layer)

On the alignment film obtained by rubbing in Example 8, a coating solution for optically anisotropic layer having the following composition is coated using a #4 wire bar.

(Coating Solution for Optically Anisotropic Layer)

| Liquid Crystalline Compound T-9 | 100 parts by mass |
|---|---|
| Air Interface Orientation Controlling Agent V-(1) | 0.2 parts by mass |
| Photopolymerization Initiator HJ-1 | 2.0 parts by mass |
| Lucirin TPO-L (produced by BASF) | 2.0 parts by mass |
| Methyl ethyl ketone | 300 parts by mass |

The film having coated thereon the optically anisotropic layer is placed in a thermostatic chamber at 110° C., heated to 90° C., held in that state for 5 minutes and then placed in a thermostatic chamber at 70° C. having an oxygen concentration of 2%. After 30 seconds, an ultraviolet ray of 600 mJ is irradiated to fix the alignment state of the optically anisotropic layer and then the film is allowed to cool to room temperature to produce a retardation film. The thickness of the optically anisotropic layer is 1.8 µm. The retardation in the direction perpendicular to the face of the obtained retardation film is 190 nm and the slow axis is parallel to the rubbing direction.

The present application claims foreign priority based on Japanese Patent Application Nos. JP2003-276043, filed Jul. 17 of 2003, the contents of which is incorporated herein by reference.

What is claimed is:

1. A compound represented by the following formula (II):

Formula (II)

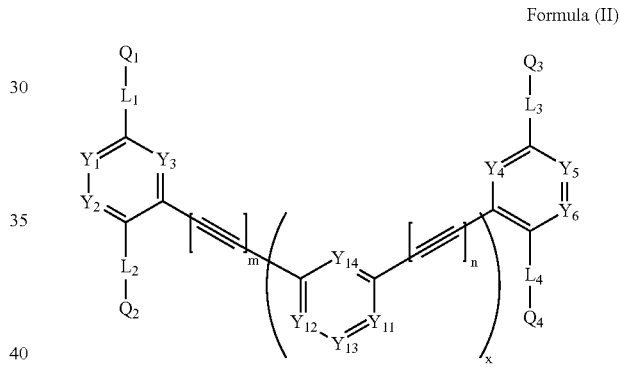

wherein $Y_{11}$ to $Y_{14}$ each independently represent a substituted or unsubstituted methine or a nitrogen atom, x represents an integer of 1 to 20, m and n each independently represent an integer of 1 to 4, $Y_1$ to $Y_6$ each independently represent methine or a nitrogen atom, $Q_1$ to $Q_4$ each independently represent a polymerizable group or a methyl group, and $L_1$ to $L_4$ each independently represent a divalent linking group, wherein when x is an integer of 2 or more, the divalent cyclic groups containing $Y_{11}$ to $Y_{14}$ may be different from each other, and the n integers representing the number of —C≡C— groups may be different from each other.

2. A compound represented by the following formula (IV):

Formula (IV)

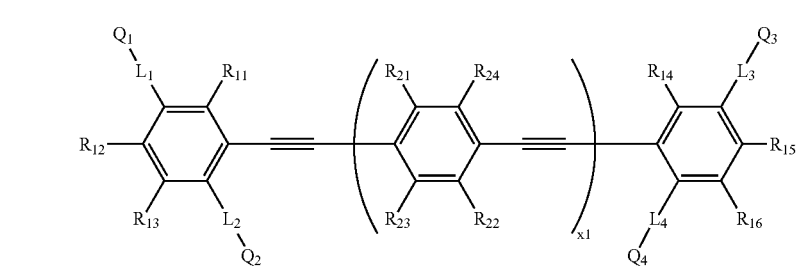

wherein $Q_1$ to $Q_4$ each independently represent a polymerizable group or a methyl group; $L_1$ to $L_4$ each independently represent a divalent linking group, wherein at least one of $L_1$ and $L_2$ is a divalent linking group including a divalent cyclic group, and at least one of $L_3$ and $L_4$ is a divalent linking group including a divalent cyclic group; $R_{12}$, $R_{13}$, $R_{15}$, $R_{16}$, $R_{23}$ and $R_{24}$ each represent a hydrogen atom, a fluorine-substituted or unsubstituted alkyl group having from 1 to 12 carbon atoms, a fluorine-substituted or unsubstituted alkoxy group having from 1 to 12 carbon atoms, a fluorine atom, a chlorine atom, a carboxyl group, a cyano group or a nitro group; $R_{11}$ and $R_{14}$ each represent a hydrogen atom, an alkyl group having from 1 to 6 carbon atoms, an alkoxy group having from 1 to 6 carbon atoms, a halogen atom, an acyl group having from 1 to 6 carbon atoms, an alkoxycarbonyl group having from 2 to 6 carbon atoms, an acyloxy group having from 1 to 6 carbon atoms or a cyano group; $R_{21}$ and $R_{22}$ each represent a hydrogen atom, an alkyl group having from 1 to 16 carbon atoms, an alkoxy group having from 1 to 16 carbon atoms, a halogen atom, an acyl group having from 1 to 16 carbon atoms, an alkoxycarbonyl group having from 1 to 16 carbon atoms, an acyloxy group having from 1 to 16 carbon atoms, a substituted or unsubstituted amino group or a group represented by formula (III):

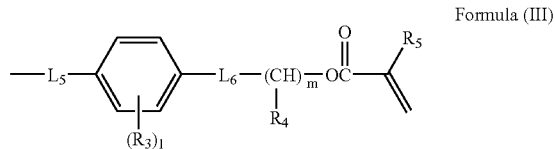

Formula (III)

wherein $L_5$ represents —CO—O—*, —O—CO—* or —O—CO—CH═CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—CH$_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group; and x1 represents an integer of 1 to 5.

3. A compound represented by the following formula (V):

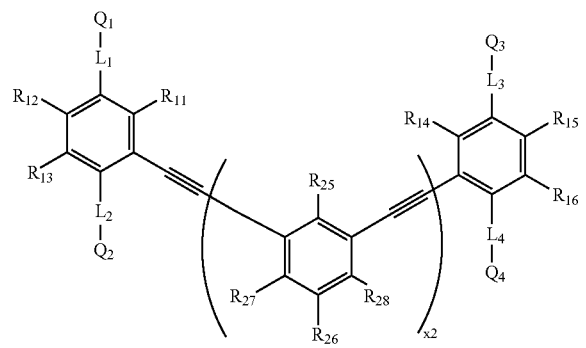

Formula (V)

$Q_1$ to $Q_4$ each independently represent a polymerizable group or a methyl group; $L_1$ to $L_4$ each independently represent a divalent linking group; $R_{12}$, $R_{13}$, $R_{15}$, $R_{16}$, $R_{27}$ and $R_{28}$ each represent a hydrogen atom, a fluorine-substituted or unsubstituted alkyl group having from 1 to 12 carbon atoms, a fluorine-substituted or unsubstituted alkoxy group having from 1 to 12 carbon atoms, a fluorine atom, a chlorine atom, a carboxyl group, a cyano group or a nitro group; $R_{11}$ and $R_{14}$ each represent a hydrogen atom, an alkyl group having from 1 to 6 carbon atoms, an alkoxy group having from 1 to 6 carbon atoms, a halogen atom, an acyl group having from 1 to 6 carbon atoms, an alkoxycarbonyl group having from 2 to 6 carbon atoms, an acyloxy group having from 1 to 6 carbon atoms or a cyano group; $R_{25}$ and $R_{26}$ each represent a hydrogen atom, an alkyl group having from 1 to 16 carbon atoms, an alkoxy group having from 1 to 16 carbon atoms, a halogen atom, an acyl group having from 1 to 16 carbon atoms, an alkoxycarbonyl group having from 1 to 16 carbon atoms, an acyloxy group having from 1 to 16 carbon atoms, a substituted or unsubstituted amino group or a group represented by formula (III):

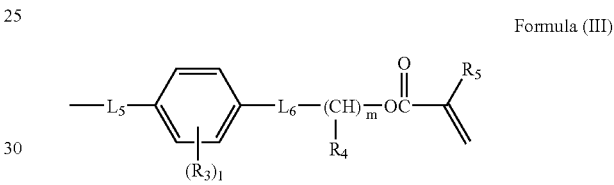

Formula (III)

wherein $L_5$ represents —CO—O—*, —O—CO—* or —O—CO—CH═CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—CH$_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group; and x2 represents an integer of 1 to 5.

4. A compound represented by the following formula (I):

Formula (I):

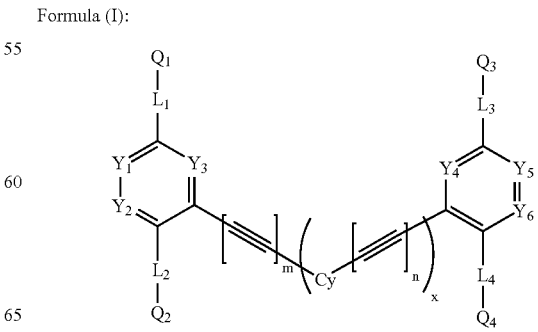

wherein Cy represents a divalent cyclic group, x represents an integer of 1 to 20, m and n each independently represent an integer of 1 to 4, $Y_1$ to $Y_6$ each independently represent methine or a nitrogen atom, $Q_1$ to $Q_4$ each independently represent a polymerizable group or a methyl group, and $L_1$ to $L_4$ each independently represent a divalent linking group, wherein -$L_1$-$Q_1$, -$L_2$-$Q_2$, -$L_3$-$Q_3$, and -$L_4$-$Q_4$ in the formula (I) each are represented by the following formula (III):

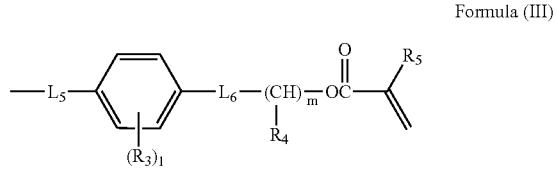

Formula (III)

wherein $L_5$ represents —CO—O—*, —O—CO—* or —O—CO—CH=CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—$CH_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group.

5. The compound according to claim 1, wherein -$L_1$-$Q_1$, -$L_2$-$Q_2$, -$L_3$-$Q_3$, and -$L_4$-$Q_4$ in the formula (II) each are represented by the following formula (III):

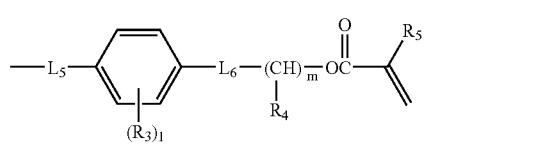

Formula (III)

wherein $L_5$ represents —CO—O—*, —O—CO—* or —O—CO—CH=CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—$CH_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group.

6. A liquid crystalline composition comprising the compound according to claim 1.

7. A liquid crystalline composition comprising the compound according to claim 2.

8. A liquid crystalline composition comprising the compound according to claim 3.

9. A liquid crystalline composition comprising the compound according to claim 4.

10. The liquid crystalline composition according to claim 6, wherein -$L_1$-$Q_1$, -$L_2$-$Q_2$, -$L_3$-$Q_3$, and -$L_4$-$Q_4$ in the formula (II) each are represent by the following formula (III):

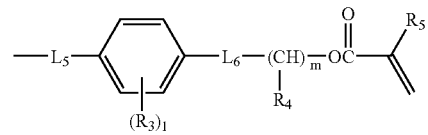

Formula (III)

wherein $L_5$ represents —CO—O—*, —O—CO—* or —O—CO—CH=CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—$CH_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group.

11. A retardation film comprising:
a transparent support; an alignment film; and at least one optically anisotropic layer in this order, wherein the at least one optically anisotropic layer is formed from the compound according to claim 1.

12. A retardation film comprising:
a transparent support; an alignment film; and at least one optically anisotropic layer in this order, wherein the at least one optically anisotropic layer is formed from the compound according to claim 2.

13. A retardation film comprising:
a transparent support; an alignment film; and at least one optically anisotropic layer in this order, wherein the at least one optically anisotropic layer is formed from the compound according to claim 3.

14. A retardation film comprising:
a transparent support; an alignment film; and at least one optically anisotropic layer in this order, wherein the at least one optically anisotropic layer is formed from the compound according to claim 4.

15. The retardation film according to claim 11, wherein -$L_1$-$Q_1$, -$L_2$-$Q_2$, -$L_3$-$Q_3$, and -$L_4$-$Q_4$ in the formula (II) each are represented by the following formula (III):

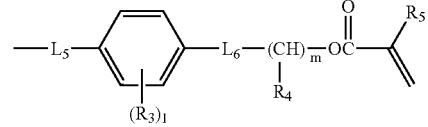

Formula (III)

wherein $L_5$ represents —CO—O—*, —O—CO—* or —O—CO—CH=CH—*, wherein * represents the position bonded to the benzene ring in formula (III); $R_3$ represents a halogen atom, an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group; l represents an integer of 0 to 4; $L_6$ represents *—O—, *—CO—O—, *—O—CO—, *—O—CO—O— or *—$CH_2$—, wherein * represents the position bonded to the benzene ring in formula (III); $R_4$ represents a hydrogen atom, a methyl group, an ethyl group or a propyl group; m represents an integer of 2 to 16; and $R_5$ represents a hydrogen atom or a methyl group.

* * * * *